United States Patent
Lienhart et al.

(10) Patent No.: US 10,136,285 B2
(45) Date of Patent: Nov. 20, 2018

(54) BLUETOOTH ALERT NOTIFICATION SERVICE

(71) Applicant: Apple Inc., Cupertino, CA (US)

(72) Inventors: Renaud Lienhart, San Francisco, CA (US); Jason C. Conn, San Francisco, CA (US); Augustin Prats, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/299,176

(22) Filed: Jun. 9, 2014

(65) Prior Publication Data

US 2014/0364089 A1 Dec. 11, 2014

Related U.S. Application Data

(60) Provisional application No. 61/832,890, filed on Jun. 9, 2013, provisional application No. 62/005,633, filed on May 30, 2014.

(51) Int. Cl.
*H04W 4/80* (2018.01)
*H04W 4/12* (2009.01)

(52) U.S. Cl.
CPC ............. *H04W 4/80* (2018.02); *H04W 4/12* (2013.01)

(58) Field of Classification Search
CPC ...... H04M 1/05; H04M 1/57; H04M 1/72533; H04M 2250/22
USPC .............................................. 455/412.2, 567
See application file for complete search history.

(56) References Cited

U.S. PATENT DOCUMENTS

| | | |
|---|---|---|
| 7,996,045 B1 | 8/2011 | Bauer et al. |
| 8,249,664 B1 | 8/2012 | Bauer et al. |
| 2008/0062940 A1 | 3/2008 | Othmer et al. |

(Continued)

FOREIGN PATENT DOCUMENTS

CN 202563627 U 11/2012

OTHER PUBLICATIONS

PCT Application No. PCT/US2014/041482—International Search Report and Written Opinion dated Oct. 16, 2014.

(Continued)

*Primary Examiner* — Christopher M Brandt
(74) *Attorney, Agent, or Firm* — Dickinson Wright RLLP

(57) ABSTRACT

A central wireless communication device communicates with a peripheral wireless communication device to provide an interactive alert notification service. The central wireless communication device obtains alert notification settings for application categories for the peripheral wireless communication device. In response to receiving an alert notification belonging to an application category enabled for the peripheral wireless communication device, the central wireless communication device sends an alert notification message that includes a unique identifier associated with the alert notification to the peripheral wireless communication device. In response to receiving an information request message that includes the unique identifier and one or more parameters, the central wireless communication device sends one or more information response messages that include the unique identifier and values for at least one of the one or more parameters to the peripheral wireless communication device.

20 Claims, 14 Drawing Sheets

(56) References Cited

U.S. PATENT DOCUMENTS

| | | | |
|---|---|---|---|
| 2009/0181726 A1* | 7/2009 | Vargas | H04M 1/72533 |
| | | | 455/567 |
| 2009/0239497 A1 | 9/2009 | Sennett et al. | |
| 2010/0043066 A1 | 2/2010 | Miliefsky | |
| 2010/0121567 A1 | 5/2010 | Mendelson | |
| 2010/0281312 A1 | 11/2010 | Cohn et al. | |
| 2010/0317289 A1* | 12/2010 | Desai | H04B 17/318 |
| | | | 455/41.2 |
| 2011/0201944 A1 | 8/2011 | Higgins et al. | |
| 2012/0257561 A1 | 10/2012 | Redding | |
| 2013/0010960 A1 | 1/2013 | Ho et al. | |
| 2013/0078946 A1 | 3/2013 | Pecen et al. | |
| 2013/0100989 A1 | 4/2013 | Copeland et al. | |
| 2013/0158369 A1* | 6/2013 | Yuen | A61B 5/0002 |
| | | | 600/301 |

OTHER PUBLICATIONS

Bluetooth® Profile Specification, Alert Notification Profile, Document No. ANP_SPEC, Revision V10r00, Sep. 15, 2011, 19 pp.

Bluetooth® Service Specification, Alert Notification Service, Document No. ANS_SPEC, Revision V10r00, Sep. 15, 2011, 22 pp.

Taiwan Patent Application No. 103119954—Office Action dated Aug. 20, 2015.

German Patent Application No. 11 2014 002 749.9—Examination Report dated Apr. 24, 2018.

Chinese Patent Application No. 201480032671.4—First Office Action dated Feb. 27, 2018.

* cited by examiner

400

| Information Banner #1 | |
|---|---|
| Reminders | |
| Task #1 | When |
| Task #2 | When |
| Calendar | |
| Appointment #1 | When |
| Information Banner #2 | |
| Messages | |
| Email #1 | Status Information |
| Voice mail #1 | Status Information |
| Connections | |
| Voice Call #1 | Status Information |
| Video Call #1 | Status Information |
| | |

FIG. 4

BLUETOOTH ALERT NOTIFICATION SERVICE

CROSS-REFERENCE TO RELATED APPLICATIONS

This application claims the benefit of U.S. Provisional Patent Application No. 61/832,890, filed Jun. 9, 2013, and entitled "BLUETOOTH ALERT NOTIFICATION SERVICE," and of U.S. Provisional Patent Application No. 62/005,633, filed May 30, 2014, and entitled "BLUETOOTH ALERT NOTIFICATION SERVICE," both of which are incorporated by reference herein in their entirety for all purposes.

FIELD OF THE DESCRIBED EMBODIMENTS

The described embodiments relate generally to wireless communications and more particularly to providing an alert notification service for a Bluetooth® wireless personal area network (WPAN) communication protocol between a central "server" wireless communication device and a peripheral "client" wireless communication device.

BACKGROUND

Some wireless communication devices implement alert notification services to communicate alert notifications to other wireless communication devices. According to many alert notification services, a central wireless communication device (e.g., a cellular phone) provides notifications to a peripheral wireless communication device (e.g., a "smart" watch, or other type of peripheral device.) The central wireless communication device may execute multiple applications and/or services that generate alert notifications related to indications of incoming connections (voice call, video call, etc.) and/or of information (e.g., messages, mail, reminders, etc.) intended for the user of the central wireless communication device. Current alert notification services provide limited capabilities and can be improved upon.

SUMMARY OF THE DESCRIBED EMBODIMENTS

Some embodiments disclosed herein provide for an alert notification service over a wireless connection between a central wireless communication device and a peripheral wireless communication device. Events associated with applications and/or services can generate alert notifications at the central wireless communication device, and one or more alert notification messages can be sent to the peripheral wireless communication device in response. The alert notification messages can include a unique identifier by which multiple alert notification messages and subsequent request or response messages exchanged between the central wireless communication device and the peripheral wireless communication device can be related. Services and/or applications on the central wireless communication device can be grouped into categories, for which alert notification settings can be provided. When an alert notification setting for a category indicates that alert notifications are enabled for a peripheral wireless communication device, alert notification messages can be communicated to the peripheral wireless communication device. In some embodiments, alert notification settings can be customized for individual peripheral wireless communication devices. The peripheral wireless communication device can respond to alert notification messages by requesting additional information about the specific alert notification message, about an application associated with the alert notification message, about a category of applications associated with the alert notification message, or a combination of these by sending one or more alert notification request messages to the central wireless communication device. The alert notification request messages can include the unique identifier by which the central wireless communication device can reference the previous alert notification message sent to the peripheral wireless communication device. The alert notification request message can also include a list of parameters for which information is specifically requested by the peripheral wireless communication device. The central wireless communication device can provide information requested in the alert notification request message to the peripheral wireless communication device in one or more alert notification response messages, which can include the unique identifier indicated in the initial alert notification message. The peripheral wireless communication device can associate information provided in the alert notification response messages with the initial alert notification message based at least in part on the unique identifier and can organize, store, and/or display information about the alert notification message to a user through an input/output interface of the peripheral wireless communication device.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

FIG. 4 illustrates a representative alert notification arrangement for displaying information on a central wireless communication device or on a peripheral wireless communication device in accordance with some embodiments.

DETAILED DESCRIPTION OF SELECTED EMBODIMENTS

Figure 1:
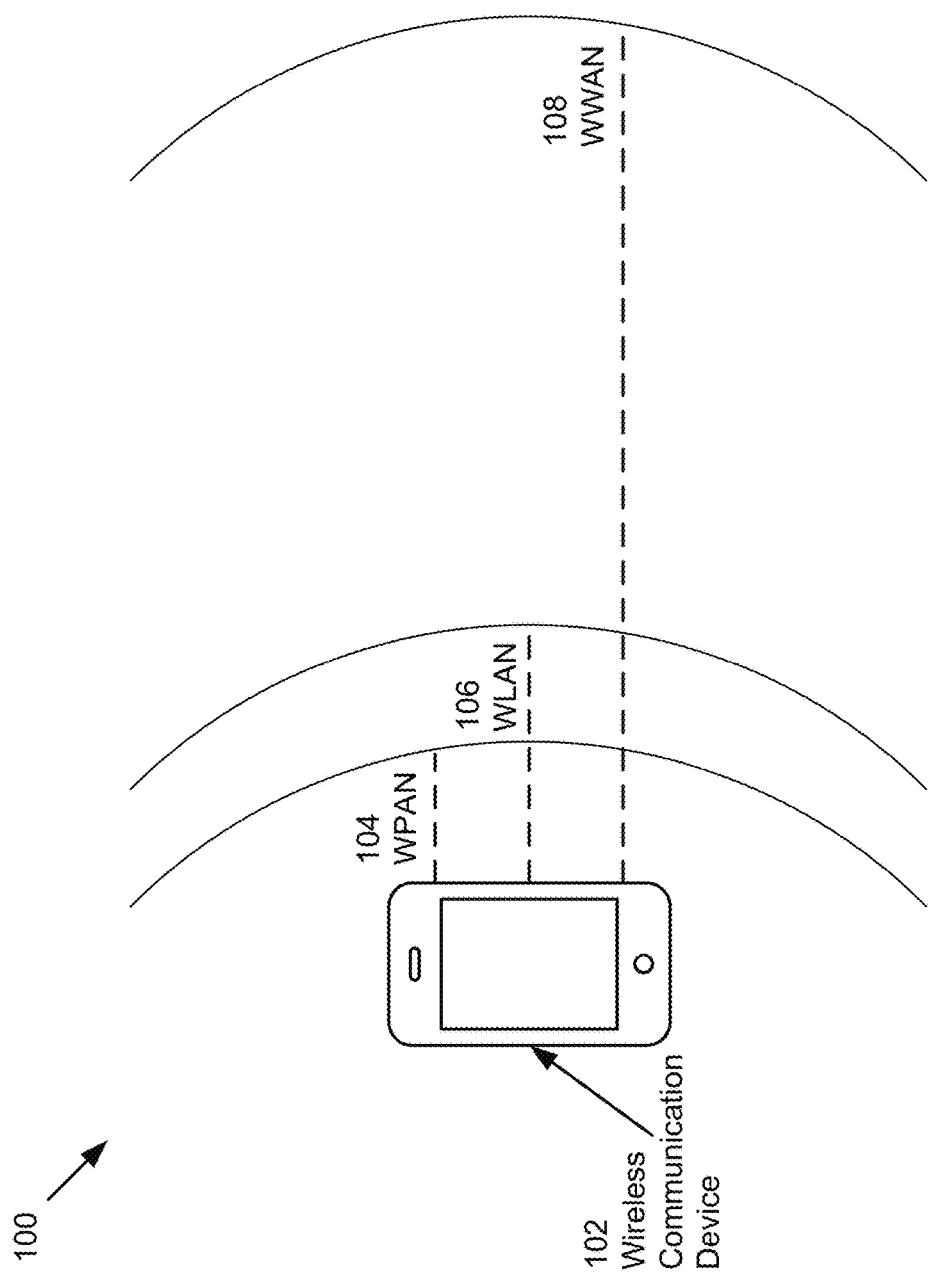
FIG. 1 illustrates a wireless communication device capable of operating in one or more different wireless communication networks in accordance with some embodiments.

The described embodiments relate generally to wireless communications and more particularly to providing an alert notification service over a connection using a Bluetooth wireless personal area network (WPAN) communication protocol between a central server wireless communication device and a peripheral client wireless communication device.

Wireless communication devices, and mobile devices in particular, can incorporate multiple different radio access technologies (RATs) to provide connections through different wireless networks that offer different services and/or capabilities. A central wireless communication device can include hardware and software to support a wireless personal area network (WPAN) according to a WPAN communication protocol, e.g., as standardized by the Bluetooth® special interest group (SIG). The central wireless communication device can discover compatible peripheral wireless communication devices and can establish connections to peripheral wireless communication devices located in order to provide specific communication services through a WPAN.

The central wireless communication device can act as a communications hub that provides access through a wireless local area network (WLAN) and/or through a wireless wide area network (WWAN) to a wide variety of services that can be supported by various applications executing on the central wireless communication device. Many applications and services can provide for alert notifications to present supplemental information to a user of the central wireless communication device, e.g., to indicate initiation of a proposed service connection (voice, video, Internet messaging, teleconferencing, etc.), to catalog one or more events (email, voice mail, reminders, appointments, etc.), or to indicate near real time information (stock, weather, sports, news, etc.). Alert notifications can be organized into various categories and presented to the user of the mobile wireless communication device on demand (e.g., in response to a user input), as an overlay (e.g., as an indicator associated with a graphical icon), or as an interrupt (e.g., as a pop-up message requiring a user response). An alert notification center on the central wireless communication device can provide a unified view of multiple alert notifications for different services and applications provided on the central wireless communication device along with interactive features to allow for information about the alert notifications to be displayed, responded to, and stored on the central wireless communication device.

The central wireless communication device can be connected to one or more peripheral wireless communication devices that can extend the input/output (I/O) capabilities of the central wireless communication device for its user. Different peripheral wireless communication devices can offer varying levels of I/O functions to permit access to services and/or information provided by applications on the central wireless communication device. Extending an alert notification center from the central wireless communication device to peripheral wireless communication devices can allow a user to access information, establish connections, and respond to alert notifications in a manner that is familiar and flexible. Many peripheral wireless communication devices can include output displays that present information to the user and accept gesture inputs from the user similar to those provided by a touch interface provided on the central wireless communication device. A user of the central wireless communication device can prefer to interface through the peripheral wireless communication device to receive and respond to alert notifications in a manner that is similar to (albeit perhaps more limited than) an alert notification center as provided on the central wireless communication device.

In a representative embodiment, an alert notification service operating on a central wireless communication device can interact with an alert notification client operating on a peripheral wireless communication device to provide detailed information about various alert notifications available on the central wireless communication device to a user through the peripheral wireless communication device. In some embodiments, the alert notification client on the peripheral wireless communication device can be defined as a profile for a WPAN wireless communication protocol, e.g., for a Bluetooth Low Energy (BTLE) wireless communication protocol. The alert notification BTLE profile can provide a wide array of information for the peripheral wireless communication device to present to a user and also mechanisms for organizing the information to associate alert notifications, e.g., using a unique identifier to provide context for interactive elements of the alert notification service. The user of the central wireless communication device can obtain base information in an initial alert notification message. The user can request additional information and receive responses to requests using the unique identifier that can be associated with an event and/or with a series of alert notification messages for a particular alert notification. The unique identifier can provide for grouping alert notification messages together into a "contextual" information flow that can extend the information available in the alert notification center of the central wireless communication device to one or more peripheral wireless communication devices. The alert notification profile (and service) can provide for an efficient transfer of information using a WPAN wireless communication protocol, while adding a capability for a bi-directional exchange of messages between the peripheral wireless communication device (acting as a client) and the central wireless communication device (acting as a server). An event associated with an application (e.g., a proposed connection, one or more new or existing messages, a set of locally or remotely generated information) can prompt an alert notification at the central wireless communication device. The user can configure one or more applications and/or categories of applications to provide alert notifications that contain all or a subset of information available at the central wireless communication device to the peripheral wireless communication device. An initial alert notification message can be sent to the peripheral wireless communication device including a unique identifier that is associated with the alert notification and a "base" set of information to display to the user through the peripheral wireless communication device. The user can respond to the initial alert notification message to retrieve additional information about the alert notification by sending an information request message back to the central wireless communication device. The information request message can include a list of parameters about which the user seeks additional information associated with the alert notification. The information request message can include the unique identifier from the initial alert notification message to provide context to process the information request message. In response to the information request message, the central wireless communication device can provide one or more information response messages that include values for the parameters requested by the peripheral wireless communication device. The one or more information response messages can include the unique identifier, and the peripheral wireless communication device can use the unique identifier to associate the returned parameter values with the information request message as well as with the initial alert notification message. The peripheral wireless communication device can obtain information and organize the obtained information using at least in part the unique identifier to present a "supplemental" alert notification center to the user of the central wireless communication device through the peripheral wireless communication device. Different events can be associated with different unique identifiers, e.g., each connection, message, information reminder or other distinct event can use a different value for the unique identifier to allow the peripheral wireless communication device to associate information provided in alert notification messages, information request messages, and information response messages together. The unique identifier can provide, at least in part, a context for the information communicated to the peripheral wireless communication device by the central wireless communication device associated with alert notifications. In some embodiments, each distinct event can be associated with a distinct unique identifier value. Multiple events associated with a particular service or application can also, in some embodiments, be grouped together with a single unique identifier, in order to present a history for the particular service or application, e.g., a proposed voice connection that is diverted to a voice mail system can be considered two related events that can be grouped with one unique identifier. As a representative example, the proposed voice connection can prompt an alert notification to the user (event #1) through the peripheral wireless communication device. The user can respond to the proposed connection by refusing to connect (event #2) through an input provided at the peripheral wireless communication device (or at the central wireless communication device). The voice connection originating party can be transferred to a voice mail system (event #3), and an alert notification message for a voice message received by the voice mail system can be presented to the user through the peripheral wireless communication device. The three events can be considered "related", and a single unique identifier can be used for notification messages sent to and responses received from the peripheral wireless communication device. In some embodiments, a set of related events can use distinct identifiers for each event instead of a single unique identifier for the set of related events. The peripheral wireless communication device can organize and present the state of the three related events to the user through a supplemental notification center available on the peripheral wireless communication device. Depending on the capabilities of the peripheral wireless communication device, the information presented can be substantially equivalent to (or a subset of) the information available through the central wireless communication device. For a sufficiently flexible input/output (I/O) interface on the peripheral wireless communication device, the supplemental alert notification service provided through the peripheral wireless communication device can replicate, at least in part, a user experience of interacting with an alert notification center as provided by a "main" alert notification service on the central wireless communication device. The alert notification service described herein can provide for extending the alert notification center capabilities of a central wireless communication device to one or more peripheral wireless communication devices.

FIG. 1 illustrates a set of overlapping networks 100 for a wireless communication device 102. The wireless communication device 102 can include a combination of hardware and software to provide wireless connections over one or more different wireless networks alone, separately, or in combination. The wireless communication device 102 can include hardware and software to provide communication over a wireless personal area network (WPAN) 104 that can provide power efficient connections while operating over a limited range. WPAN connections can typically provide for connecting the wireless communication device 102 to peripheral wireless communication devices, e.g., headsets, earpieces, supplemental display devices, and supplemental input/output devices. A representative WPAN 104 can operate in accordance with a communication protocol specified by the Bluetooth SIG. The wireless communication device 102 can also include hardware and software to provide communication over a wireless local area network (WLAN) 106 that can provide a higher data rate and a greater operating range than a WPAN 104. The wireless communication device 102 can include separate hardware and software for the WPAN 104 and the WLAN 106. In some embodiments, the WPAN 104 and the WLAN 106 can share hardware and or software elements in the wireless communication device 102. Both the WPAN 104 and WLAN 106 can operate as "local" networks. The wireless communication device 102 can include additional hardware and software to provide a wireless wide area network (WWAN) 108 capability, e.g., to interconnect with one or more cellular networks. The wireless communication device 102 can provide a multitude of services using one or more connections through its wireless networking capabilities, and an alert notification center on the wireless communication device 102 can provide alert notifications to a user of the wireless communication device 102 for one or more services. In addition, local applications on the wireless communication device 102 can generate alert notifications to provide additional information to the user of the wireless communication device 102. The alert notification center on the wireless communication device 102 can provide a unified view of alert notifications for the various services and applications resident on and/or available to the wireless communication device 102.

Figure 2:
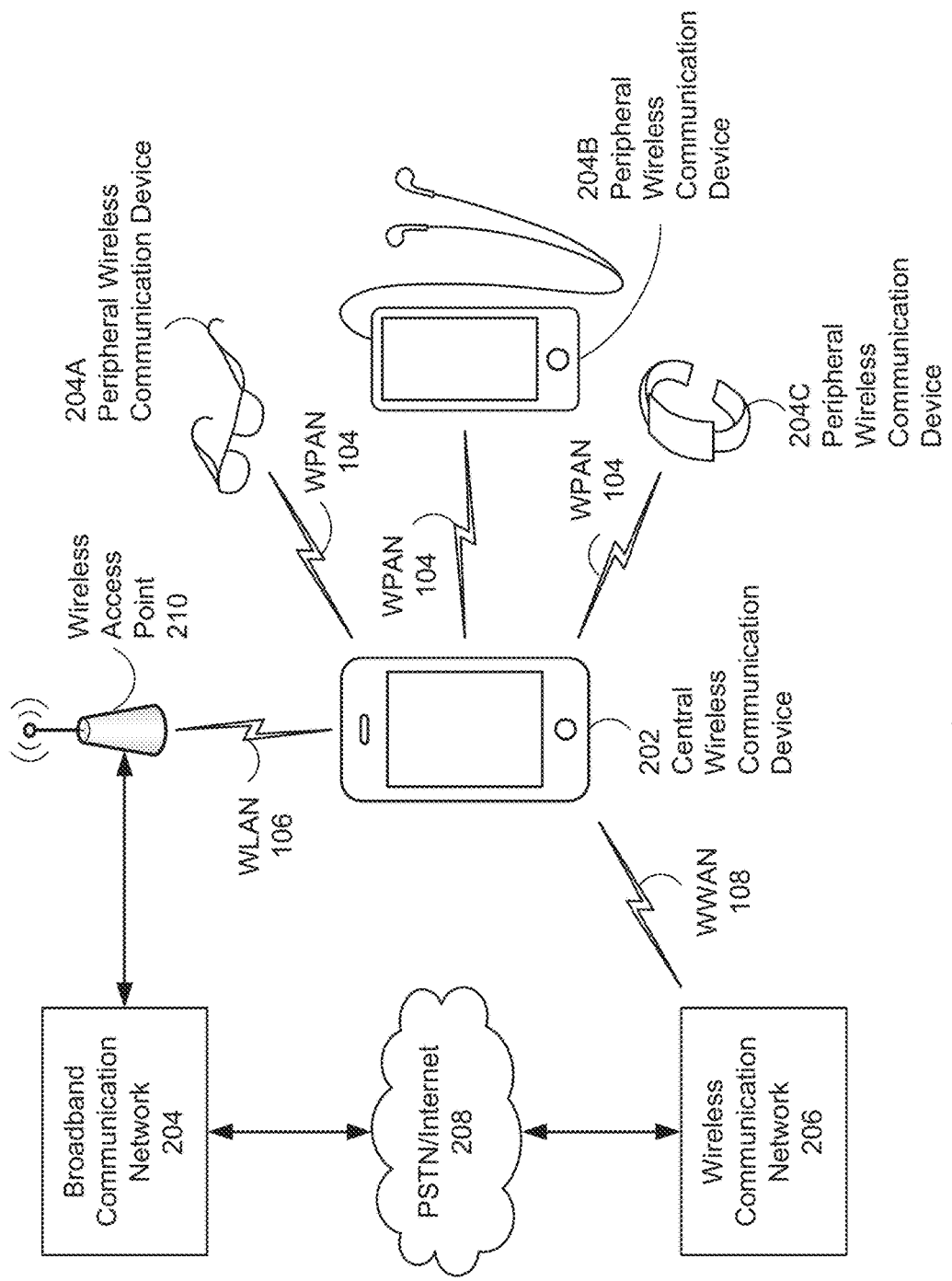
FIG. 2 illustrates a representative set of wireless communication paths interconnecting a central wireless communication device to multiple wireless communication networks and to multiple peripheral wireless communication devices in accordance with some embodiments.

FIG. 2 illustrates a central wireless communication device 202 interconnected through several different wireless communication technologies to an external set of networks and to a set of peripheral wireless communication devices 204A, 204B, and 204C. The central wireless communication device 202 can receive information from one or more packet switched networks and/or from one or more circuit switched networks, the combination of which is represented in FIG. 2 as a combination of a public switched telephone network (PSTN) and the "Internet" 208. The central wireless communication device 202 can use a WWAN connection 108 provided through a wireless communication network 206 to access a broad variety of services (e.g., voice calls, text messages, data access, video calls, multimedia messaging, and media streaming). Similarly, the central wireless communication device 202 can use a WLAN connection 106 provided through a wireless access point (AP) 210 interconnected to a broadband communication network 204 to access a similar wide range of services. The broad set of services provided through the WWAN connection 108 and/or through the WLAN connection 106 can generate one or more alert notifications associated with the services or with applications executed by the central wireless communication device that access and/or use the services. The alert notifications can be presented to a user of the central wireless communication device 202, e.g., through an integrated I/O display of the central wireless communication device 202. The capabilities of the central wireless communication device 102 can be supplemented by adding one or more WPAN connections 104 to one or more peripheral wireless communication devices 204 as illustrated in FIG. 2.

Each of the peripheral wireless communication devices 204 illustrated in FIG. 2 can provide output display capabilities as well as input response capabilities to allow the user of the central wireless communication device 202 to interact with services through the central wireless communication device 202 (and/or also interact with applications executed by a processor on the central wireless communication device 202). The capabilities of the peripheral wireless communication devices 204 can vary substantially, and therefore each peripheral wireless communication device 204 can provide a different level of I/O functionality. A first peripheral wireless communication device 204A can provide an "always available" visible display capability that can present alert notification information to the user of the central wireless communication device 202, with a limited input response capability to browse through and/or respond to the presented alert notification information. A second peripheral wireless communication device 204B can provide a primary service and/or application function, e.g., acting as a media player, while also including a display, a touch interface, and one or more wireless connection functions, to permit use as a supplemental display for alert notification information provided from the central wireless communication device 202. The second wireless communication device 204B can provide input/output capabilities for presenting information and accepting user responses similar to that offered by the central wireless communication device 202. A third peripheral wireless communication device 204C can provide a readily accessible display and touch interface that can also present alert notification information to a user of the central wireless communication device 202 and allow for flexibly organizing the information presented and accept user inputs to browse and respond to the alert notification information. By providing an alert notification service on the central wireless communication device 202 in conjunction with an alert notification client on the peripheral wireless communication devices 204A/B/C, multiple alert notification messages can be provided to one or more of the peripheral wireless communication device 204A/B/C. In addition, the central wireless communication device 202 can send supplemental information response messages to one or more of the peripheral wireless communication devices 204A/B/C in response to information request messages received from the peripheral wireless communication devices 204A/B/C.

Figure 3:
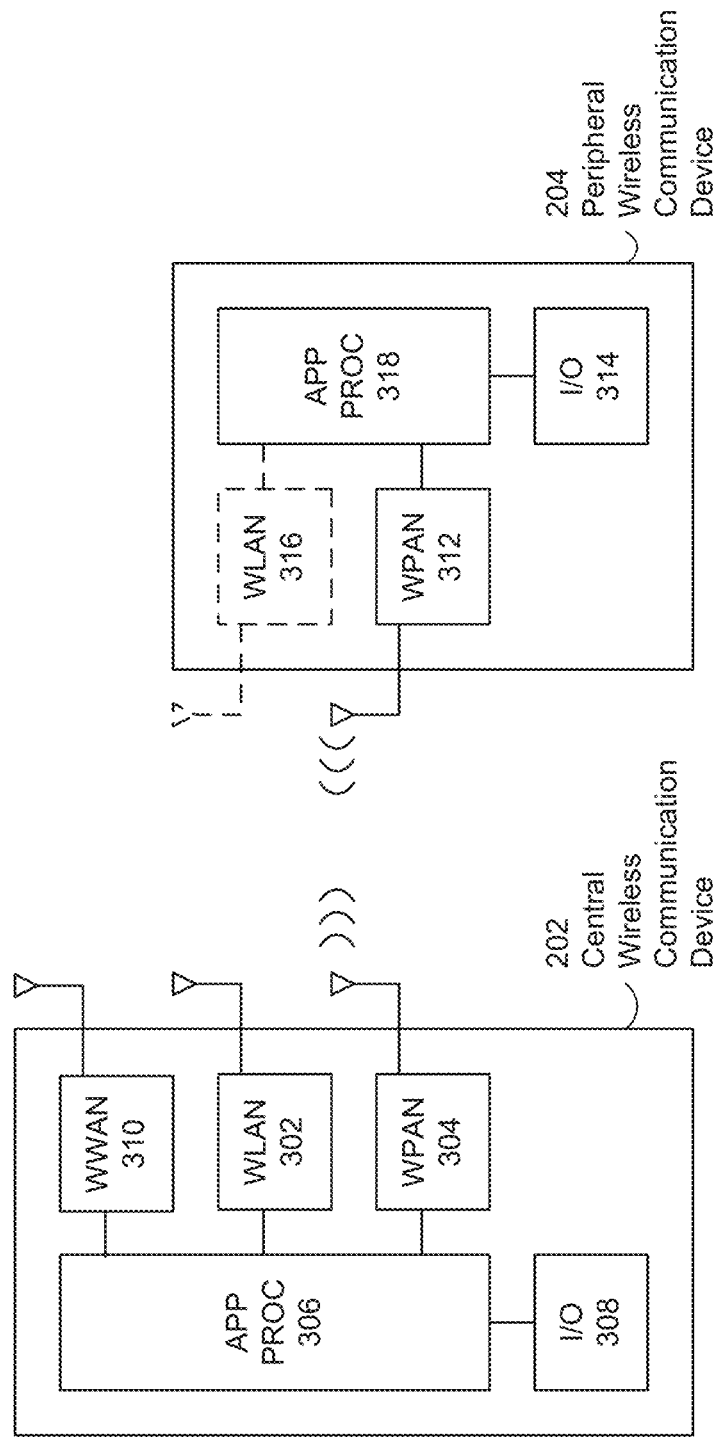
FIG. 3 illustrates a direct wireless personal area network connection between the central wireless communication device and a peripheral wireless communication device in accordance with some embodiments.

FIG. 3 illustrates a representative embodiment of elements included in the central wireless communication device 202 to communicate through a WPAN connection to a representative embodiment of elements included in the peripheral wireless communication device 204. The central wireless communication device 202 can include multiple wireless networking hardware blocks to offer connections in accordance with one or more different wireless communication protocols. A wireless networking hardware block can include hardware for a wireless transmitter and a wireless receiver (also referred to in combination as a wireless transceiver) or elements thereof, and/or include circuitry (such as a processor and/or digital signal processing (DSP) circuitry) that perform functionalities such as physical layer processing and/or data link layer processing. In some embodiments, a wireless networking hardware block may perform actions that are defined in software instructions (and/or firmware instructions) that are associated with the wireless networking hardware block. The central wireless communication device 202 can connect to external networks through a WLAN hardware block 302 and/or a WWAN hardware block 310. The central wireless communication device 202 can include processing circuitry coupled to the wireless networking hardware blocks to control the central wireless communication device 202, e.g., an application processor 306. The application processor 306 in the central wireless communication device 202 can establish connections and process information obtained through established connections to offer different services to the user of the central wireless communication device 202. The user of the central wireless communication device 202 can interact with the central wireless communication device 202 through an input/output (I/O) interface 308, which can provide for displaying information (e.g., including an alert notification center) and accepting user inputs to navigate information and/or access services available on and/or through the central wireless communication device 202. In some embodiments, the central wireless communication device 202 can accommodate multiple I/O interfaces 308. In some embodiments, a combination of software executing on the application processor 306 can provide a user interface using the I/O interface 308 to display information (outputs) to the user of the wireless communication device 202 and/or to obtain feedback (inputs) from the user of the wireless communication device 102.

The central wireless communication device 202 can be connected using a WPAN hardware block 304 to the peripheral wireless communication device 204, which in turn can include a parallel WPAN hardware block 312 connected to its own application processor 318. The application processor 318 in the peripheral wireless communication device 204 can provide input and output capabilities through a I/O interface 314 and supplement the I/O capabilities of the central wireless communication device 202 to provide the user of the central wireless communication device 202 an alternate I/O interface 314 through which to receive and respond to information including alert notifications. In some embodiments, the I/O interface 314 can provide a more limited display of information than offered by the I/O interface 308 of the central wireless communication device 202. The application processor 318 of the peripheral wireless communication device 204 can process information received through the WPAN hardware block 312 to display information through the I/O interface 314 for an alert notification service that mirrors, at least in part, information available to the user provided by an alert notification center on the central wireless communication device 202. The application processor 318 can also process user inputs received through the I/O interface 314 to form and send messages to the central wireless communication device 202 using the WPAN hardware block 312 in accordance with the alert notification service, e.g., by generating information request messages in response to user inputs received through the I/O interface 314 that request additional information about one or more alert notification messages received from the central wireless communication device 202. The application processor 318 in the peripheral wireless communication device 204 can also organize and store information received from the central wireless communication device 202, including information from both initial alert notification messages and subsequent information response messages, to present a unified view of the information that correlates one or more messages together. In some embodiments, the alert notification messages, information request messages, and information response messages include a common unique identifier to provide context and link the messages together for a particular alert notification associated with a communication service and/or with an application provided by and/or through the central wireless communication device 202. In some embodiments, the peripheral wireless communication device 204 includes an optional WLAN hardware block 316 through which a WLAN connection can be realized with the central wireless communication device 202.

FIG. 4 illustrates a representative embodiment of a display 400 of alert notification information, e.g., presented as a part of an alert notification center through the I/O interface 308 of the central wireless communication device 202. All or a portion of the information shown for the display 400 of FIG. 4 can also be presented through the I/O interface 314 of the peripheral wireless communication device 204. The amount of information presented at one time, how the information is organized, and/or how the information is presented, can be the same or different on the I/O interface 314 of the peripheral wireless communication device 204 to the presentation of information on the I/O interface 308 of the central wireless communication device 202. Different peripheral wireless communication devices 204 can have different display capabilities, and as such, presentation of information can be adapted to best suit the particular display capability of the I/O interface 314 of the peripheral wireless communication device 204. Information associated with alert notifications can be presented as information banners (e.g., sliding stock tickers, scrollable weather lists, etc.). Information associated with alert notifications can also be presented grouped into categories (reminders, calendar, messages, connections) associated with one or more applications and/or with one or more services offered by and/or through the central wireless communication device 202. In some embodiments, alert notifications can be presented organized by time, by category, by application, by service, by sender, by subject, or by one or more other characteristics selected by the user of the central mobile wireless communication device 202. In some embodiments, alert notifications for linked events can be presented together, e.g., a voice mail message associated with a missed voice call. A multi-functional I/O display, e.g. as provided by the I/O interface 308 of the central wireless communication device 202, can present a broad array of information in an easily accessible and navigable manner. As a peripheral wireless communication device 204 can provide a similar (if in some embodiments more limited) display capability, it can be desired to provide an alert notification service between the central wireless communication device 202 and the peripheral wireless communication device 204 in order to provide, at least in part, a similar user experience for receiving and processing alert notification information via the peripheral wireless communication device 204.

Figure 5:
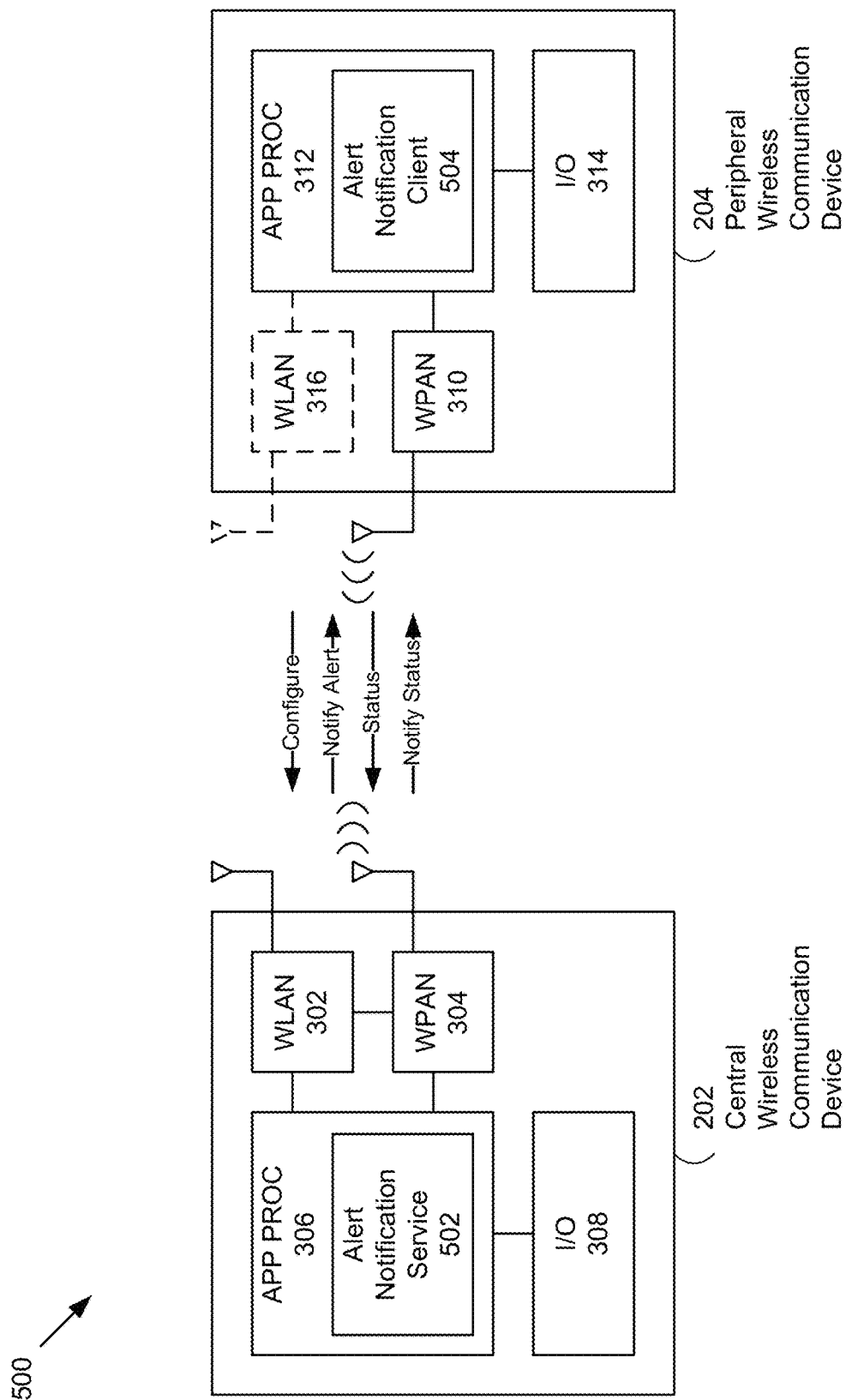
FIG. 5 illustrates communication between a central wireless communication device and a peripheral wireless communication device for an alert notification service in accordance with some embodiments.

FIG. 5 illustrates an embodiment of an alert notification system 500 in which the central wireless communication device 202 includes an alert notification service 502 executing at least in part on the application processor 306. The alert notification service 502 of the central wireless communication device 202 communicates through a WPAN connection (via the WPAN hardware blocks 304/310) with an alert notification client 504 executing at least in part on the application processor 318 of the peripheral wireless communication device 204. The user of the central wireless communication device 202 can configure alert notifications that can be presented through the I/O interface 314 of the peripheral wireless communication device 204. In some embodiments, configuration messages to configure the alert notifications are sent from the peripheral wireless communication device 204 to the central wireless communication device 202, e.g., in response to one or more user inputs received through the I/O interface 314 and/or based on embedded software included in the peripheral wireless communication device 204. In some embodiments, the one or more configuration messages from the peripheral wireless communication device 204 can include (1) a request to discover services provided by the central wireless communication device 202 and/or (2) an indication of characteristics of the peripheral wireless communication device 204 to the central wireless communication device 202. In some embodiments, the peripheral wireless communication device 204 can subscribe to an alert notification service provided by the central wireless communication device 202. In an embodiment, a service, an application, a category of services, a category of applications, a set of events, and/or another grouping of actions that can result in one or more alert notifications can be configured to provide one or more alert notification messages to be sent by the central wireless communication device 202 to the peripheral wireless communication device 204. As a representative example, the user of the central wireless communication device 202 can configure the central wireless communication device 202 to provide alert notifications for voice connections, interactive video connections, email messages, instant messaging services, SMS/MMS services, calendar reminders, or combinations of these. The central wireless communication device 202 can provide alert notification messages to the peripheral wireless communication device 204 based on the configuration established by the user and/or based on default configuration settings. Alert notifications that are not enabled for communication to the peripheral wireless communication device 204 can be presented on the central wireless communication device 202 but not presented on the peripheral wireless communication device 204. In an embodiment, the peripheral wireless communication device can receive status information for a service, an application, a category of services, a category of applications, a set of events, and/or another grouping of actions, e.g., a count of unread email messages, a count of new voice messages, or a count of missed calls. The status information can be provided to the peripheral wireless communication device 204 to present to the user through the I/O interface 314 of the peripheral wireless communication device 204. In some embodiments, the peripheral wireless communication device 204 can request a status update, and the central wireless communication device 202 can provide an alert notification status message to the peripheral wireless communication device 204.

Figure 6A:
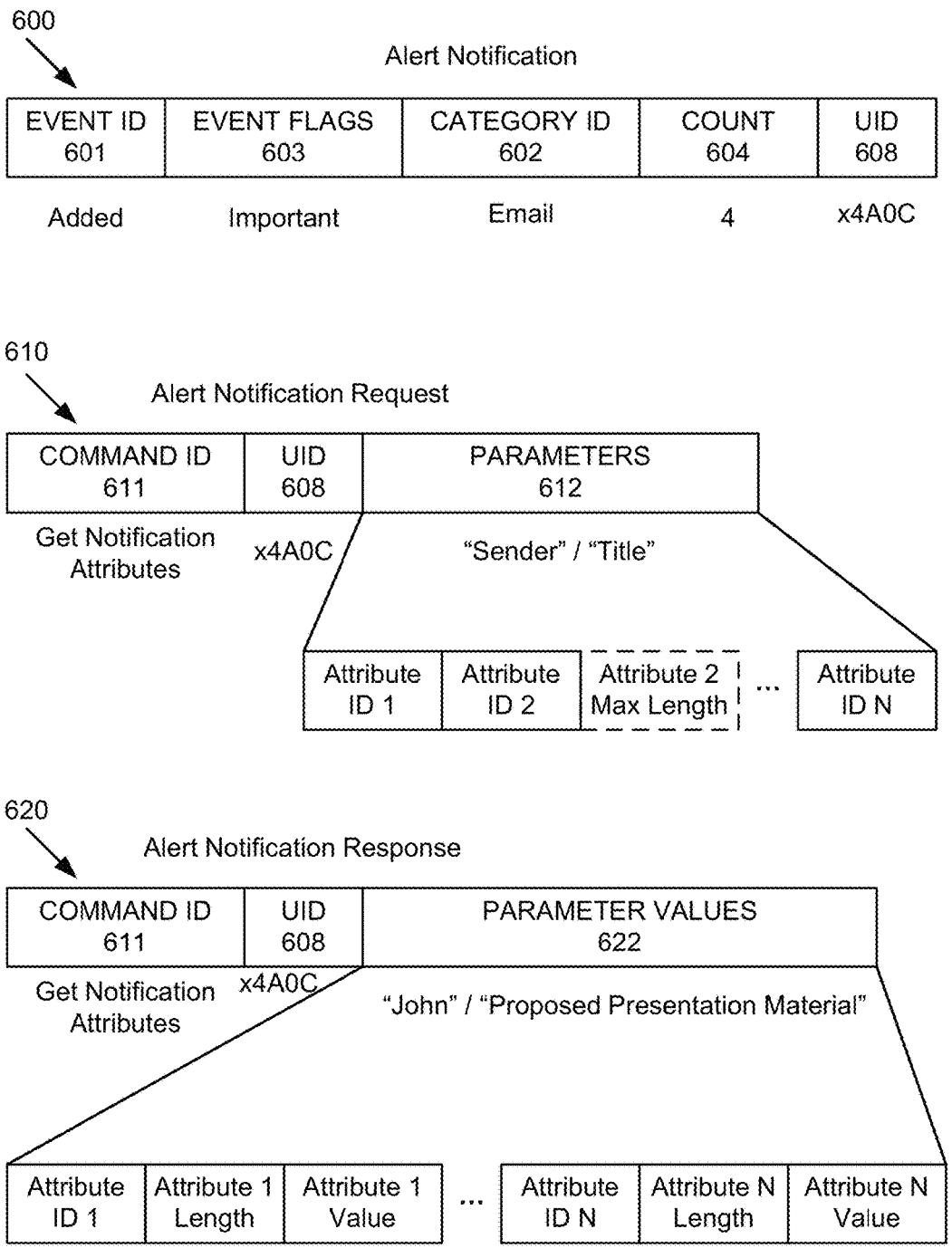
FIGS. 6A, 6B, and 6C illustrate formats for alert notifications, information requests, and information responses, and an alert notification lifespan for an alert notification service between the central wireless communication device and the peripheral wireless communication device in accordance with some embodiments.

FIG. 6A illustrates representative formats for messages 600/610/620 that can be communicated between the central wireless communication device 202 and the peripheral wireless communication device 204 to realize aspects of an alert notification service. The alert notification service can provide for communicating to the peripheral wireless communication device 204 a substantial amount of information and allow for a bi-directional exchange of messages between the central wireless communication device 202 and the peripheral wireless communication device 204. Initial alert notification messages 600 sent to the peripheral wireless communication device 204 from the central wireless communication device 202 in response to an event can include a base set of information. The base set of information for the initial alert notification message 600 can include an event identifier (ID) field 601, an event flags field 603, a category ID field 602, a category count field 604, and a unique identifier (UID) field 608.

The event ID field 601 of the initial alert notification message 600 can provide an indication of a change to a category specified in the category ID field 602, e.g., in relation to the initial alert notification message 600 or in relation to a set of alert notifications for a specific category. In an embodiment, the event ID field 601 can include values, such as "added," "modified," or "removed," which can refer to how the alert notification message 600 relates to the particular category that is indicated by a value provided in the category ID field 602. An alert notification message 600 for a category in which a new event has occurred, e.g., a new email message or a newly scheduled calendar reminder, can include an "added" status indication in the event ID field 601 of the alert notification message 600. An alert notification message 600 that provides an update or a change to status for a category (e.g., a schedule reminder update) can include a "modified" status indication in the event ID field 601. As a representative example, an alert notification message associated with an update to a calendar invite (new time, new place, updated attendee list, etc.) can include a "modified" status indication in the event ID field 601. An alert notification message 600 that provides an indication of a deletion of a message, an email was read, a reminder was deleted, a time for a scheduled appointment was passed, or an action item was completed, can include a "removed" status indication in the event ID field 601. The definitions for the status indications provided herein are representative and not intended to be limiting. Other definitions and/or uses for the values in the event ID field 601 described and additional values can also be used for the event ID field 601 included in alert notification messages 600.

The "event flags" field 603 can include a high level indication for how the peripheral wireless communication device 204 may handle the alert notification message 600. For example, the event flags field 603 can include a value that provides properties associated with the particular alert notification message 600 being provided, with an event associated with the particular alert notification message 600 (or with a set of alert notification messages 600 that may be associated with a particular event), and/or with a category for the alert notification message 600. The value of the event flags field 603 can be specified as a bit mask, in some embodiments, in which each bit provides a particular property value. Alternatively, the value of the event flags field 603 can be a multi-bit pattern, half byte value, full byte value, multi-byte value, or another suitable numerical representation. In an embodiment using a bit mask, each bit in the bit mask can provide an indication of a specific property that can apply to the alert notification message 600. Representative properties can include an "importance" level, such as whether the alert notification message 600 is "important" (bit value=1) or "not important" (bit value=0). Alternatively a set of n>1 bits taken together can indicate a level of importance when more than a binary importance level is used. The peripheral wireless communication device 204 can use the importance indication provided in the event flags field 603 of the alert notification message 600 to determine how the alert may be provided to the user, e.g., "important" alert notification messages 600 can be provided first in a list of alert notification messages 600, or can be indicated with a particular marking (e.g., a "red" exclamation point or "highlighted" or displayed using a distinctive font).

The Event Flags field 603 can also include an indication for a "notification level" to use when alerting the user of the received alert notification message 600. For example, a bit in a bit mask of the Event Flags field 603 can indicate a "silent" property, e.g., for alert notification messages 600 that the peripheral wireless communication device 204 should provide a "non-intrusive" indication to a user, such as without an audible indication or a vibration indication when the alert notification message 600 is received by the peripheral wireless communication device 204. Alternatively, a set of n>1 bits can be used to provide different levels of audible indication and/or vibration indication associated with a particular alert notification message 600, such as high, medium, low, and off/silent notification levels.

The Event Flags field 603 can also include an indication that a particular alert notification is "pre-existing", such as when providing an alert notification message 600 for an event that occurred already in the past at the central wireless communication device 202, e.g., before the existing connection between the central wireless communication device 202 and the peripheral wireless communication device 204 was established. Thus, the alert notification message 600 may be considered "new" to the particular peripheral wireless communication device 204 (and therefore the alert notification message 600 is being sent to the particular peripheral wireless communication device 204) but can already exist at the central wireless communication device 202 when the connection to the particular peripheral wireless communication device 204 occurs (and therefore there is a "pre-existing" event for which the alert notification message 600 is now being provided to the peripheral wireless communication device 204). An event can be considered "pre-existing" separately for each peripheral wireless communication device 204 that connects to the central wireless communication device 202. An alert notification message that includes a "pre-existing" flag indication can be treated differently by the peripheral wireless communication device 204 than an alert notification message 600 provided for a "new" event. Pre-existing alert notification messages 600 can be received with minimal or no audible indications or vibration indications at the peripheral wireless communication device 204. For example, in some embodiments, pre-existing alert notification messages 600 can be received without providing an audible/vibration indication. Alternatively, one consolidated audible/vibration indication can be provided for a group of "pre-existing" alert notification messages 600 provided together by the central wireless communication device 202 to the peripheral wireless communication device 204. In some embodiments, one audible/vibration indication can be provided for each set of N "pre-existing" alert notification messages 600 provided by the central wireless communication device 202 to the peripheral wireless communication device 204 (where N is a positive integer specifying a group of alert notification messages 600). How a particular peripheral wireless communication device 204 handles a "pre-existing" alert notification message 600 can be based on attributes of the particular peripheral wireless communication device 204 and/or based on user preferences.

The Event Flags field 603 of the alert notification message 600 can also include an indication of a type of action for the peripheral wireless communication device 204 to provide to the user (e.g., via the display and/or another I/O interface). In some embodiments, one bit of the Event Flags field 603 can indicate a "positive" action that can be taken by the user in response to the alert notification message 600 received at the peripheral wireless communication device 204. An indication that a "positive" action can be taken by the user can include displaying a "green" box and/or a "check mark" on the display of the peripheral wireless communication device 204. The type of "positive" action that can result from the user selecting (or otherwise responding positively) to the indication via the peripheral wireless communication device 204 can be implicitly understood by the user based on the context of the received alert notification message or can be explicitly indicated (e.g., accompanied by a text indication of the action). The amount of information to display can be based on capabilities or settings for the particular peripheral wireless communication device 204. As a representative example, a green box and/or check mark displayed based on an alert notification message 600 received at the peripheral wireless communication for an "incoming call" can provide the user an indication that the incoming call can be accepted. Thus, an exemplary positive action is an acceptance of a proposed connection.

The Event Flags field 603 of the alert notification message 600 can also include an indication of a "negative" action that can be taken by the user in response to the alert notification message 600. The indication of a "negative" action can include displaying a "red" box and/or an "X mark" on the display of the peripheral wireless communication device 204. The type of "negative" action to result can be implicitly understood or can be explicitly indicated in various embodiments. As a representative example, a red box and/or an X mark displayed at the peripheral wireless communication device 204 in response to receipt of an alert notification message 600 for an "incoming call" can provide the user an indication that the incoming call can be declined. Thus, an exemplary negative action is a refusal of a proposed connection.

In some embodiments, both a positive action and a negative action can be indicated for a particular alert notification message 600, thereby providing the user of the peripheral wireless communication device 204 a choice of actions to take in response to the received particular alert notification message 600. In some embodiments, more than two actions can be indicated for the alert notification message 600 (e.g., additional bits providing indications of multiple different actions available to the user). For example, a proposed connection can have a positive action "accept", a first negative action "decline", and a second negative action "divert to voice mail". As another example, an alert notification message 600 for a received voice mail event can include a first positive action "listen", a second positive action "store", and a negative action "delete".

In some embodiments, the peripheral wireless communication device 204 can obtain information for how to display a set of actions for a received alert notification message 600. The peripheral wireless communication device 204 can obtain the information by retrieval from internal memory and/or from an external source. A default positive action and/or a default negative action can be associated with an alert notification message 600, and the peripheral wireless communication device 204 can have already stored information to display in response to receiving an indication of a positive action and/or negative action in the alert notification message 600. In some embodiments, display information for actions can be "localized", e.g., adapted to user preferences such as a language to use for display. In some embodiments, a positive action and/or a negative action, when selected by a user, can result in additional information and/or options to be presented (e.g., a hierarchical display of information for the alert notification message 600 can be provided.)

The category ID field 602 of the alert notification message 600 can include (i) an indication of the category type for the alert notification/event that prompted the initial alert notification message 600, (ii) a type of application that generated the initial alert notification message 600, or (iii) another "categorization" value for the event and/or application and/or alert notification that resulted in the initial alert notification message 600. In an embodiment, the category ID field 602 can indicate a particular type of event, message, application, or other "category" that can correspond to an originator of the alert notification message 600. Representative categories that can be identified by the category ID field 602 can include email, voice mail, various forms of messaging services, proposed connections (e.g., voice/video/chat), missed connections, social media, calendar scheduling, news item, business/finance item/update, location information, entertainment information, health/fitness information, and "other" (e.g., for a non-specific alert notification).

The count field 604 of the alert notification message 600 can represent a number of "active" events and/or alert notification messages 600 that correspond to a category specified in the category ID field 602. In an embodiment, the count field 604 can represent a number of pending, unread, or otherwise unattended events associated with a particular category specified in the category ID field 602 of the alert notification message 600. In some embodiments, the peripheral wireless communication device 204 can display a value provided in the count ID field 604 as an overlay indicator associated with an icon or other representation for a particular category identified by the category ID field 602. In a representative embodiment, the count ID field 604 value can represent a number of unread email messages, a number of available voice mail messages, a number of unread messaging service alerts, a number of missed proposed connections (e.g., missed voice calls or video calls), a number of reminder alerts pending, a number of calendar reminders for a particular time period, a number of unviewed news alert items over a particular time period, a number of unviewed business/finance items/updates over a particular time period, a number of health and fitness items not yet viewed and/or reviewed, a number of unviewed entertainment related messages, a number of unviewed social application messages, etc. The count ID field 604, in some embodiments, can depend on a status for the category as maintained at a server, repository, or other storage location associated with the central wireless communication device 202. In some embodiments, a category count can be updated periodically or at irregular intervals, e.g., by a "push" service provided to one or more peripheral wireless communication devices 204 by the central wireless communication device 202, or by a "pull" action automatically or in response to a user request received at the central wireless communication device 202 from the peripheral wireless communication device 204. The count ID field 604, in some embodiments, can include a value for a current number of active notifications in a given category including "new" as well as "pending" (e.g., notified but not yet attended to/read/viewed) events/messages for a particular category.

The alert notification message 600 can also include a unique identifier (UID) field 608 that includes a value by which the central wireless communication device 202 and the peripheral wireless communication device 204 can relate different alert notification messages 600, alert notification requests 610, and/or alert notification responses 620 together, e.g., to provide a context by which to interpret the information and the status provided in an alert notification message 600 or in alert notification response messages 620 sent to the peripheral wireless communication device 204 by the central wireless communication device 202. The UID field 608 can be represented by any pre-defined numerical format, e.g., a hex value as shown, or another similar representation. In some embodiments, each new alert notification message 600 can use a new UID value in the UID field 608, e.g., incrementing through a 32 bit value, and thus providing for 2^32 distinct UID values.

Figure 6B:
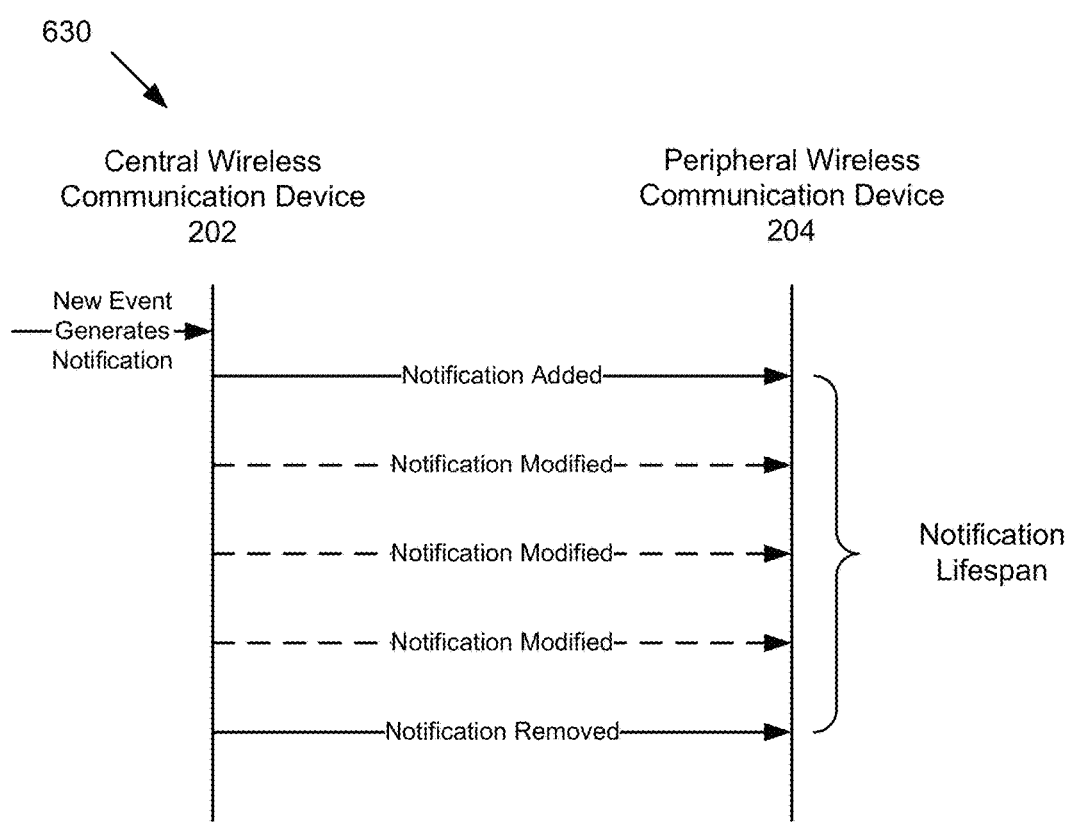

An alert notification event can be "created" on the central wireless communication device 202 when an alert notification message 600 is first sent, e.g., with an event ID field 601 value of "added." The alert notification event can then "exist" on the central wireless communication device 202 through several optional modifications, e.g., as indicated by subsequent alert notification messages 600 having an event ID field 601 value of "modified." The alert notification event can be "deleted" on the central wireless communication device 202 when a final alert notification message 600 is sent having an event ID field 601 value of "removed." FIG. 6B illustrates a diagram 630 of a representative "lifespan" for an alert notification event having an initial "added" alert notification message 600, one or more optional "modified" alert notification messages 600, and a final "removed" alert notification message 600 sent from the central wireless communication device 202 to the peripheral wireless communication device 204. Additional query and response messages exchanged between the central wireless communication device 202 and the peripheral wireless communication device 204, as discussed further herein, are not shown in the diagram 630 of FIG. 6B.

The alert notification service can also include commands that can be sent between the peripheral wireless communication device 204 and the central wireless communication device 202. For example, the peripheral wireless communication device 204 can request additional information about an alert notification for which the peripheral wireless communication device 204 received an alert notification message 600 from the central wireless communication device 202. For example, an alert notification request message 610, having a format as illustrated in FIG. 6A, can be sent from the peripheral wireless communication device 204 to the central wireless communication device 202. (The alert notification request message 610 can also be referred to as an alert request message, or an information request message.) The alert notification request message 610 can be sent in response to a previously received alert notification message 600 (or can be sent at any time after reception of a particular alert notification message 600 that can be identified uniquely by a value in the UID field 608 included in the alert notification request message 610 sent to the central wireless communication device 202 by the peripheral wireless communication device 204.) The alert notification request message 610 can specify the type of request being made using a "Command Identifier (ID)" 611 field. The alert notification request message 610 can also include a UID field 608 having a value by which the peripheral wireless communication device 204 can uniquely identify a previous alert notification message 600 (or an underlying event associated with the previous alert notification message 600) for which additional information is requested by the peripheral wireless communication device 204 from the central wireless communication device 202. The alert notification request message 610 can include a parameters field 612 in which a list of one or more parameters (or attributes) are indicated to request information about the previous alert notification message(s) 600 uniquely identified by the UID field 608. The parameters field 612 of the alert notification request message 610 can include requests for multiple types of information, and the particular parameters/attributes included in the parameters field 612 can depend on the type of alert notification message 600 for which information is sought. In some embodiments, the number of parameters/attributes included in the parameters field 612 for the alert notification request message 610 can vary with each particular alert notification request message 610 sent by the peripheral wireless communication device 204 to the central wireless communication device 202. As illustrated in FIG. 6A, an "Attribute Identifier (ID)" in the parameters field 612 of the alert notification request message 610 can specify information that is requested by the peripheral wireless communication device 204. In some embodiments, an optional "maximum length" parameter can be included with an Attribute ID to specify a maximum length (e.g., in bytes) to use when sending information for the associated Attribute ID for which the peripheral wireless communication device 204 requests information from the central wireless communication device 202. Thus, the peripheral wireless communication device 204 can request an amount of information that is matched to its own capabilities for display to the user and/or for storage at the peripheral wireless communication device 204. In some embodiments, an Attribute ID can be two bytes long. In some embodiments, a default maximum length can be specified and/or requested by a peripheral wireless communication device 204 for any Attributes for which information is requested. In some embodiments, only some Attributes can require that the use of a maximum length be specified (and thus a default maximum length can apply only to those Attributes that need by limited).

The alert notification service can also include an alert notification response message 620. (The alert notification response message 620 can also be referred to as an alert response message or an information response message.) The central wireless communication device 202 can reply to an alert notification request message 610, received from the peripheral wireless communication device 204, specified by a "Get Notification Attributes" value in the Command ID 611 field and designating a particular alert notification message 600 using a particular UID 608 value. The central wireless communication device 202 can send an alert notification response message 620 having the same Command ID 611 value ("Get Notification Attributes") and includes the particular UID field 608 value (thereby continuing to provide context for the set of messages 600/610/620 exchanged between the central wireless communication device 202 and the peripheral wireless communication device 204). The Command ID 611 field and UID 608 field of the alert notification response message 620 are followed by one or more values for parameters/attributes in a parameter values field 622. The set of parameters/attributes included in the parameter values field 622 of the alert notification response message 620 can correspond to the parameters/attributes requested in the alert notification request message 610 received by the central wireless communication device 202 from the peripheral wireless communication device 204. In some embodiments, the provided parameter/attribute values 622 included in the alert notification response message 620 can be formatted and organized according to a "Type" (e.g., as indicated by an Attribute ID), a "Length" (e.g., as indicated by an Attribute Length), and a "Value" (e.g., as indicated an Attribute Value) 6A. The parameter/attribute values field 622 can be presented as a list of Attribute ID's, Attribute Lengths, and Attribute Values grouped as shown in FIG. 6A. An Attribute Value can be a number/string having a length in bytes (or other agreed upon pre-determined units) specified by the Attribute Length. When an Attribute Value is not available or not otherwise provided in response to an Alert Notification Request message 610, the Attribute ID can be included with an Attribute Length of "0" and a "Null" (Empty) Attribute value (e.g., no Attribute value provided). In some embodiments, the Alert Notification Response message 620 can be sent as a series of multiple messages (or message fragments) divided by the central wireless communication device 202 and reassembled by the peripheral wireless communication device 204. A complete Alert Notification Response message 620 sent by the central wireless communication device 202 can include information (and/or "Null" indications) for each of the Attributes requested in the Alert Notification Request message 610 received from the peripheral wireless communication device 204.

Figure 6C:
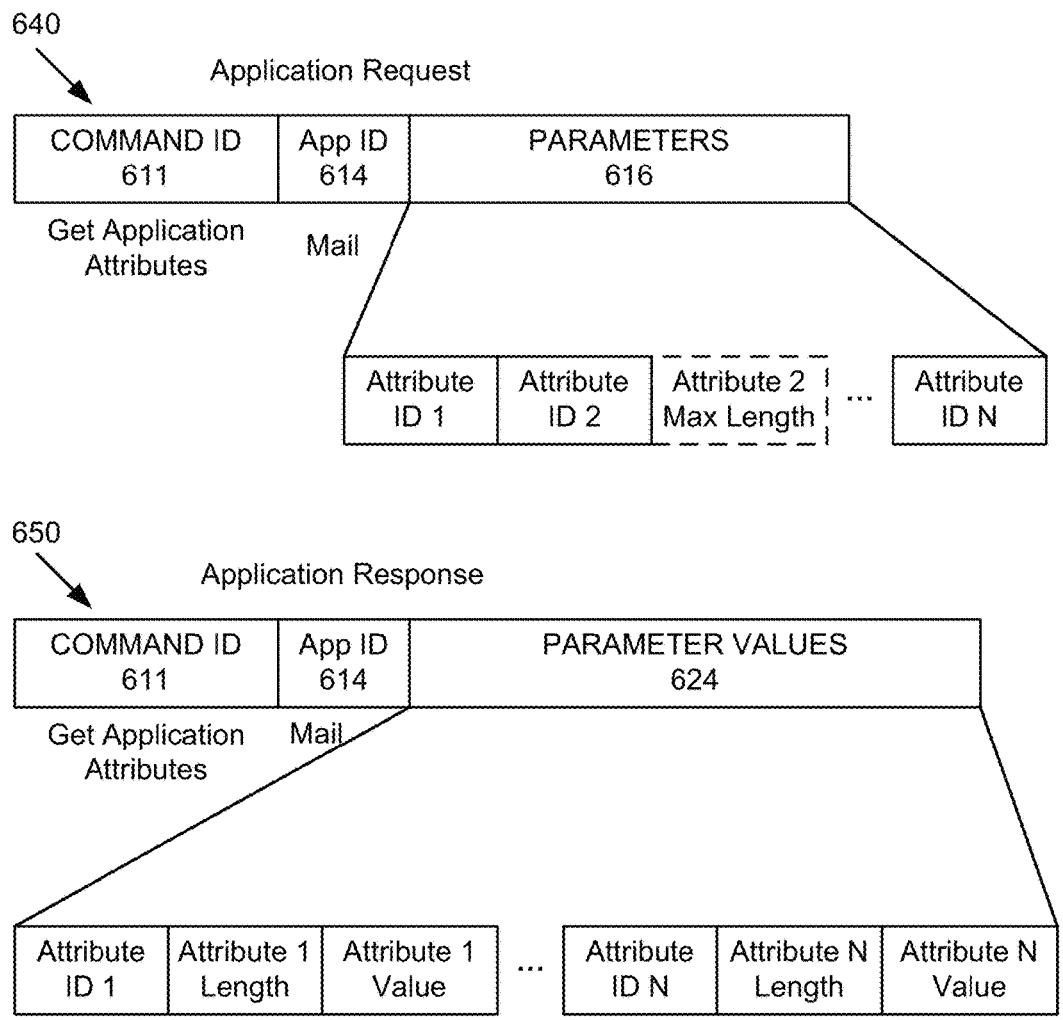

FIG. 6C illustrates another set of request and response messages that can be communicated between the peripheral wireless communication device 204 and the central wireless communication device 202. In addition, to requesting information about a particular Alert Notification message 600, the peripheral wireless communication device 204 can also request information about a specific application that generated one or more Alert Notification messages 600. For example, the original Alert Notification message 600 provided to the peripheral wireless communication device 204 can identify a category (e.g., by providing information in the Category ID field 602). The peripheral wireless communication device 204 can request additional information about the Alert Notification message 600 using the Alert Notification Request message 610 including a parameter/attribute that indicates a request for the Application that generated the Alert notification message 600 (or the underlying event that resulted in the Alert notification message 600 sent to the peripheral wireless communication device 204). The central wireless communication device 202 can provide an identifier (e.g., a "Name" or other indication) for the Application in the Alert Notification Response message 620 sent to the peripheral wireless communication device 204 in response to the Alert Notification Request message 610. To request additional information about the Application, the peripheral wireless communication device 204 can send an Application Request message 640 to the central wireless communication device 202 using a format as indicated in FIG. 6C, including a Command Identifier (ID) field 611 having a value of "Get Application Attributes" followed by an Application ID field 614 and a set of parameters 616, which can be formatted in a similar manner to the set of parameters 612 included in the Alert Notification Request message 610 shown in FIG. 6A. The parameters field 616 of the Application Request message 640 can include a set of Attribute Identifiers (IDs) with optional maximum length values that can be used to limit the amount of information provided when responding to a request for information about a particular attribute. The central wireless communication device 202 can respond to the Application Request message 640 with an Application Response message 650 that includes the same Command ID 611 of "Get Application Attributes" followed by the specific Application ID 614 for which information is requested and a set of parameter values 624 that list attributes as requested. The set of parameter values 624 provided by the central wireless communication device 202 can be formatted as a list of Attribute IDs, Attribute Lengths, and Attribute Values. An attribute value can be a number/string having a length in bytes as specified by an associated Attribute Length. When a requested Attribute has no value to provide (or is not provided for another reason), the Attribute Length in the parameter values 624 can be set to "zero" and the Attribute Value field can be "null" or "empty" (i.e., not provided). The Application Response message 650 can be split into multiple smaller messages, in some embodiments, such as when a maximum transmission unit used for communication between the central wireless communication device 202 and the peripheral wireless communication device 204 is less than what the Application Response message 650 requires. Each of the individual smaller messages, in some embodiments, can include the Command ID 611 value of "Get Application Attributes" and the App ID 614 value associated with the set of parameter values 624 provided.

Figure 7A:
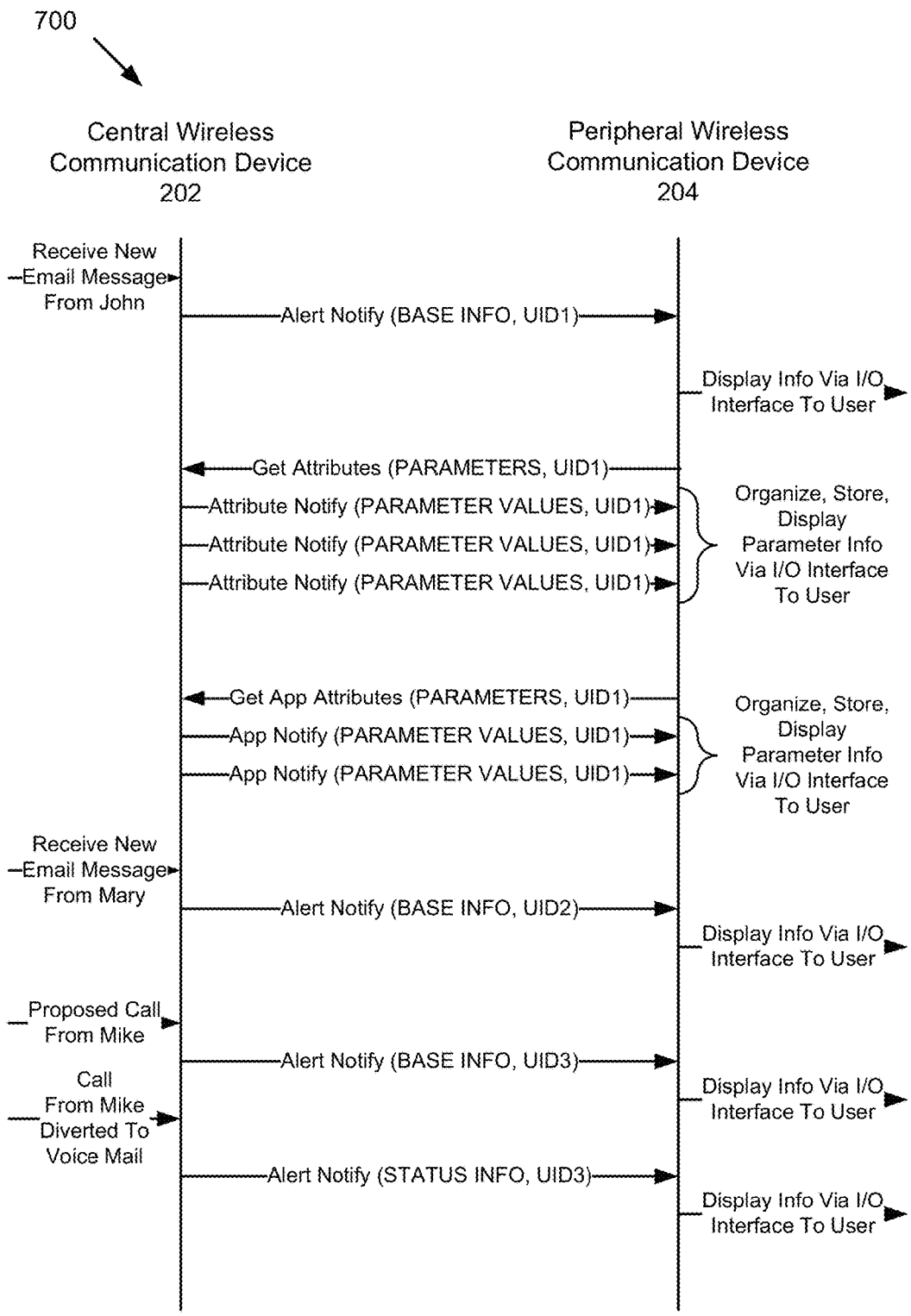
FIGS. 7A and 7B illustrate exchanges of messages communicated between the central wireless communication device and the peripheral wireless communication device for the alert notification service in accordance with some embodiments.
Figure 7B:
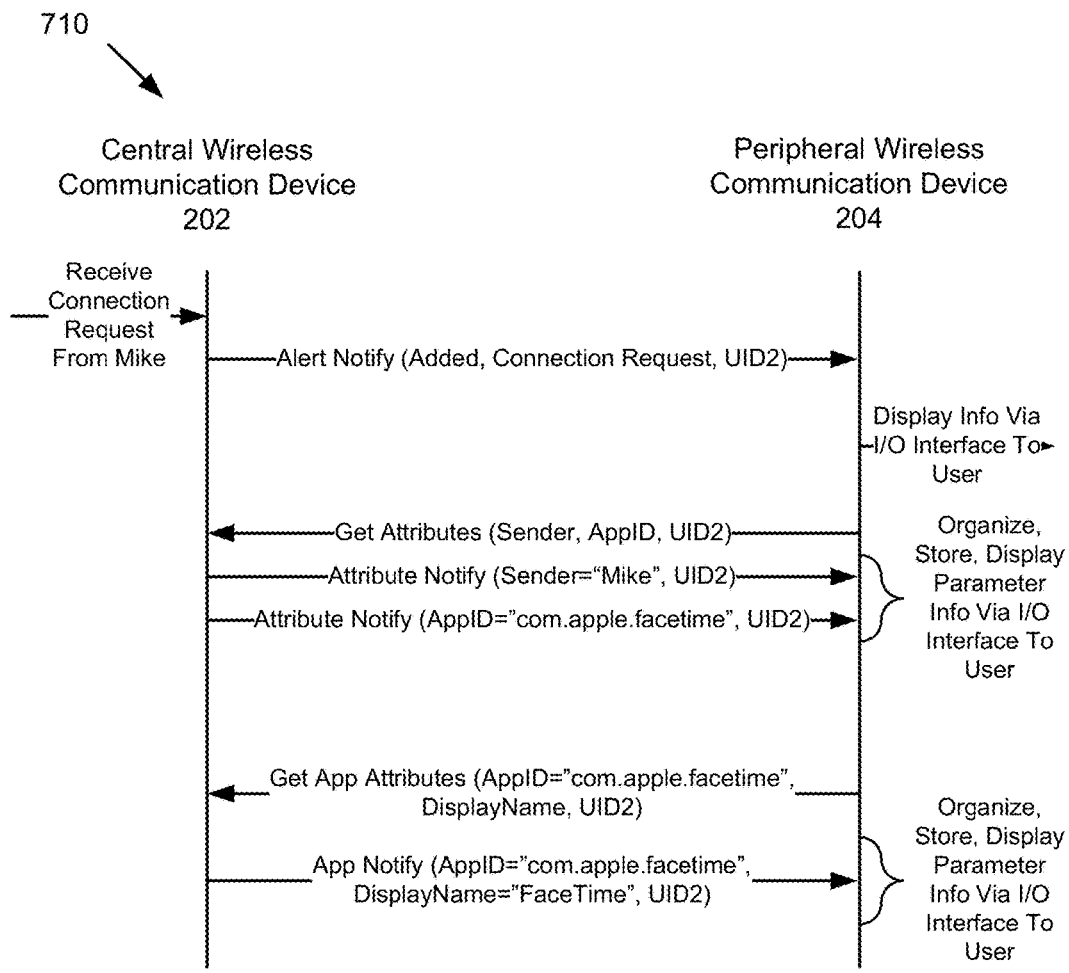

FIGS. 7A AND 7B illustrate representative message sequences 700/710 for an alert notification service that can be provided by the central wireless communication device 202 to the peripheral wireless communication device 204. Three different types of messages, as shown, can provide different types of information to the peripheral wireless communication device 204, with each of the messages including a UID value in a UID field 608 that can provide context to link the different messages together for organization, storage, and/or display by the peripheral wireless communication device 204. The set of messages illustrated in FIGS. 6A to 6C provide a representative format that can be used for the messages shown in FIGS. 7A and 7B, in some embodiments. For example, the "Alert Notify" message of FIGS. 7A AND 7B can correspond to the "Alert Notification Message" of FIG. 6A; the "Get Attributes" message of FIGS. 7A AND 7B can correspond to the "Alert Notification Request" message of FIG. 6A; the "Attribute Notify" message of FIGS. 7A AND 7B can correspond to the "Alert Notification Response" message of FIG. 6A; the "Get App Attributes" message of FIGS. 7A AND 7B can correspond to the "Application Request" message of FIG. 6C; and the "App Notify" message of FIGS. 7A AND 7B can correspond to the "Application Response" message of FIG. 6C.

As an example of an exchange of messages 700 between the central wireless communication device 202 and the peripheral wireless communication device 204, a representative initial event as shown includes receipt of an email message from a sender "John" at the central wireless communication device 202. The central wireless communication device 202, in response to the event, can send an initial alert notification message 600 (indicated as an "Alert Notify" message) to the peripheral wireless communication device 204. The alert notification message 600 can include a "base" set of information (e.g., a set of fields as shown in FIG. 6A including, but not limited to, an event ID 601, a set of event flags 603, a category ID 602, and a count value 604) and a value UID1 in the unique identifier (UID) field 608. The value (UID1) can correspond to the event and/or to the alert notification that generates the initial alert notification message 600. The peripheral wireless communication device 204 can respond to the initial alert notification message 600 (or to other previous alert notification messages 600) and use the value of the unique identifier (UID) field 608 (e.g., UID1) to indicate the particular event and/or alert notification to which any subsequent alert request messages 610, sent by the peripheral wireless communication device 204, refer. Similarly, alert response messages 620, e.g., responses that provide information based on alert request messages 610, sent to the peripheral wireless communication device 204 by the central wireless communication device 202, can include the unique value of the unique identifier (UID) field 608 to provide a context by which to associate different alert response messages 620 (and their content) together.

The peripheral wireless communication device 204 can display information to a user through the I/O interface 314 based at least in part on information received from the central wireless communication device 202 in the alert notification message 600. The base information included in the alert notification message 600 can include a category identifier field 602 as described earlier (or a broader extension of such a category identifier field 602), a count field 604, an event ID field 601, and a unique ID field 608. The peripheral wireless communication device 204 can respond to the alert notification message 600 by sending an alert request message 610 to retrieve additional information about the event and/or the alert notification indicated by the unique ID field 608 in the alert notification message 600. The alert request message 610 sent by the peripheral wireless communication device 204 to the central wireless communication device 202 can include the unique value of the unique identifier field 608 received in the initial alert notification message 600 in order to specify to which event and/or alert notification to which the inquiry for additional information pertains. As illustrated in FIG. 7A, the alert request message 610 ("Get Attributes") can request to retrieve attributes associated with the event and/or the alert notification by inquiring for information using a list of parameters in a parameters field 612 of the alert request message 610. In some embodiments, the alert request message 610 can include a value in a Command ID field 611 that corresponds to a request to "Get Notification Attributes". The requested information parameters listed in the "Get Attributes" alert request message 610 can depend on a type of alert notification message 600 to which the alert request message 610 pertains (and/or depend on the base information previously provided in the initial alert notification message 600). As a representative example, in response to an alert notification message 600 for an email message, the peripheral wireless communication device 204 can inquire about one or more of: a sender identifier, a subject line (title) of the email message, an application identifier (for an application on the central wireless communication device 202 that originated the alert notification message 600), and a summary (and/or portion, including all) of the body text of the email message.

The central wireless communication device 202 can send one or more alert notification response messages 620 that contain values for the parameters requested in the "Get Attributes" alert request message 610. Each alert notification response message 620 can include a portion of information requested for the parameters specified in the alert request message 610, and the alert notification response messages 620 can include the unique value for the unique identifier field 608 that can refer to the initial alert notification message 600 (and/or its underlying event) uniquely.

The peripheral wireless communication device 204 can also request information about the application that generated the initial alert notification message 600 (and/or underlying event) associated with the unique identifier 608 by sending a "Get App Attributes" application request message 640 that includes a set of parameters for which the peripheral wireless communication device 204 seeks additional information. Representative parameters include an application name and an application category with which to associate the initial alert notification message 600 and event. The central wireless communication device 204 can respond to the "Get App Attributes" application request message 640 with an "App Notify" application response message 650, which can include parameter values for the parameters requested in the "Get App Attributes" application request message 640. The "App Notify" application response message 650 can include the Unique Identifier (UID) value in the unique identifier field 608 to associate the provided information with the initial alert notification message 600.

The peripheral wireless communication device 204 can use information provided by the central wireless communication device 202 in the original alert notification message 600, in one or more alert notification response messages 620, and in one or more application response messages 650 to provide a form of an alert notification center that displays a rich array of information with contextual linking of the information for the user of the peripheral wireless communication device 204. The peripheral wireless communication device 204 can organize, store, and/or display parameter value information, received in the one or more alert notification response messages 620 and application response messages 650, through the I/O interface 314 to the user. In some embodiments, the peripheral wireless communication device 204, in response to receiving an alert notification message 600, automatically generates a set of parameters to include in an alert notification request message 610 sent to the central wireless communication device 202. In some embodiments, the peripheral wireless communication device 204 responds to alert notification messages 600 based on user preferences obtained through the I/O interface 314 of the peripheral wireless communication device 204 and/or through the I/O interface 308 of the central wireless communication device 202.

Each unique event at the central wireless communication device 202 can be associated with a unique identifier (UID) value, which can be provided in the UID field 608 of the initial alert notification message 600. As illustrated in FIG. 7A, for a new email message received at the central wireless communication device 202 from a sender indicated as "Mary," the central wireless communication device 202 can send a new alert notification message 600 that includes a new unique identifier value (shown as UID2) along with base information corresponding to the new email message received by the central wireless communication device 202 to the peripheral wireless communication device 204. Similarly, a proposed connection (e.g., a voice call) received from an originating party indicated as "Mike" can generate a new alert notification message 600 sent to the peripheral wireless communication device 204, the new alert notification message 600 can include a further new unique identifier value (shown as UID3) along with base information for the proposed connection. In some embodiments, a subsequent event can be related to a previous event, e.g., the proposed "call" from "Mike" can be diverted to voice mail (e.g., in response to an input from the user through the I/O interface 308 of the central wireless communication device 202, or through the I/O interface 314 of the peripheral wireless communication device 204, or based on a timeout when the proposed call is not responded to.) The central wireless communication device 202 can recognize that a subsequent voice mail message is related to the previous incoming connection and can include a value in the unique identifier field 608 (shown as UID3) for the proposed connection event in the alert notification message 600 sent following the voice mail message. In some embodiments, two related events (e.g., a proposed call and an associated voice mail message) can generate alert notification messages with two different values in the UID field 608. Thus, a proposed call can include a value UID3, while an associated voice mail message can include a value UID4 (not shown). The alert notification message 600, in some embodiments, can include "status information" that provides an indication that a previous proposed connection (voice call) was diverted to voice mail and/or a voice mail message is pending that relates to the proposed connection (that was diverted or missed.) The unique identifier field 608 can provide for linking the two distinct events together as related events, in some embodiments, by using the same value in the UID field 608, and the peripheral wireless communication device 204 can organize, store, and/or display the status information provided for the voice mail in conjunction with the previous base information provided with the proposed connection attempt.

FIG. 7B illustrates another representative message exchange between the central wireless communication device 202 and the peripheral wireless communication device 204 for an alert notification service. In response to receiving an connection request from "Mike", the central wireless communication device 202 can generate an alert notification and send an Alert Notification message 600 ("Alert Notify") to the peripheral wireless communication device 204. The alert notification message 600 can include an Event ID 601 having a value of "Added" and a Category ID 602 indicating an incoming "Connection Request". Information based on the received alert notification message 600 can be displayed to a user via the I/O interface 314. The peripheral wireless communication device 204 can respond based on a user input and/or based on a user defined or default configuration to the Alert Notification message 600 with an Alert Notification Request message 610 that includes a list of parameters for which the peripheral wireless communication device 204 seeks more information from the central wireless communication device 202. The Alert Notification Request message 610 can include a request for a "Sender" and an "AppID" that identifies from whom the connection request originates and an identifier for the Application that generated the event that resulted in the Alert Notification message 600. The central wireless communication device 202 can respond with an Alert Notification Response message 620 that includes parameter values, e.g., identifying the Sender as "Mike" and the AppID as "com.apple.facetime". The peripheral wireless communication device 204 can use the received parameter values to organize, store, and/or display additional parameter information to the user. The peripheral wireless communication device 204 can subsequently send an additional command, e.g., an Application Request message 640, that seeks additional information about the Application identified in the Alert Notification Response message 620 and that generated the event that resulted in the initial Alert Notification message 600. For example, the peripheral wireless communication device 204 can request a name to display ("Display-Name") for the Application to provide to the user. The central wireless communication device 202 can respond with an Application Response message 650 that includes parameter values for the parameters requested, e.g., a DisplayName value of "FaceTime" can be provided corresponding to the "com.apple.facetime" AppID. The peripheral wireless communication device 204 can use the additional information received in the Application Response message 650 to organize, store, and/or display further parameter information to the user. In some embodiments, the peripheral wireless communication device 204 can store information received from the central wireless communication device 202, such as relating AppID's with DisplayName values or other information for an Application, so that information can be displayed at the peripheral wireless communication device 204 without sending one or more request commands to the central wireless communication device 202. Thus previously received information can be later retrieved by the peripheral wireless communication device 204 for particular alert notifications, events, associated applications, etc.

In some embodiments, the central wireless communication device 202 can respond to a command/request (e.g., an Alert Notification Request 610 or an Application Request 640) received from the peripheral wireless communication device 204 by sending an error indication message. For example, when the command/request received from the peripheral wireless communication device 204 includes an unrecognized Command ID 611 value, the central wireless communication device 202 can respond by sending a message indicating that the Command ID 611 value is not recognized. Similarly, when the central wireless communication device 202 receives from the peripheral wireless communication device 204 an improperly formatted command/request or a command/request that includes parameter values that are invalid, the central wireless communication device 202 can send to the peripheral wireless communication device 204 an error message that indicates receipt of a command with improper formatting or invalid parameter values.

Figure 8:
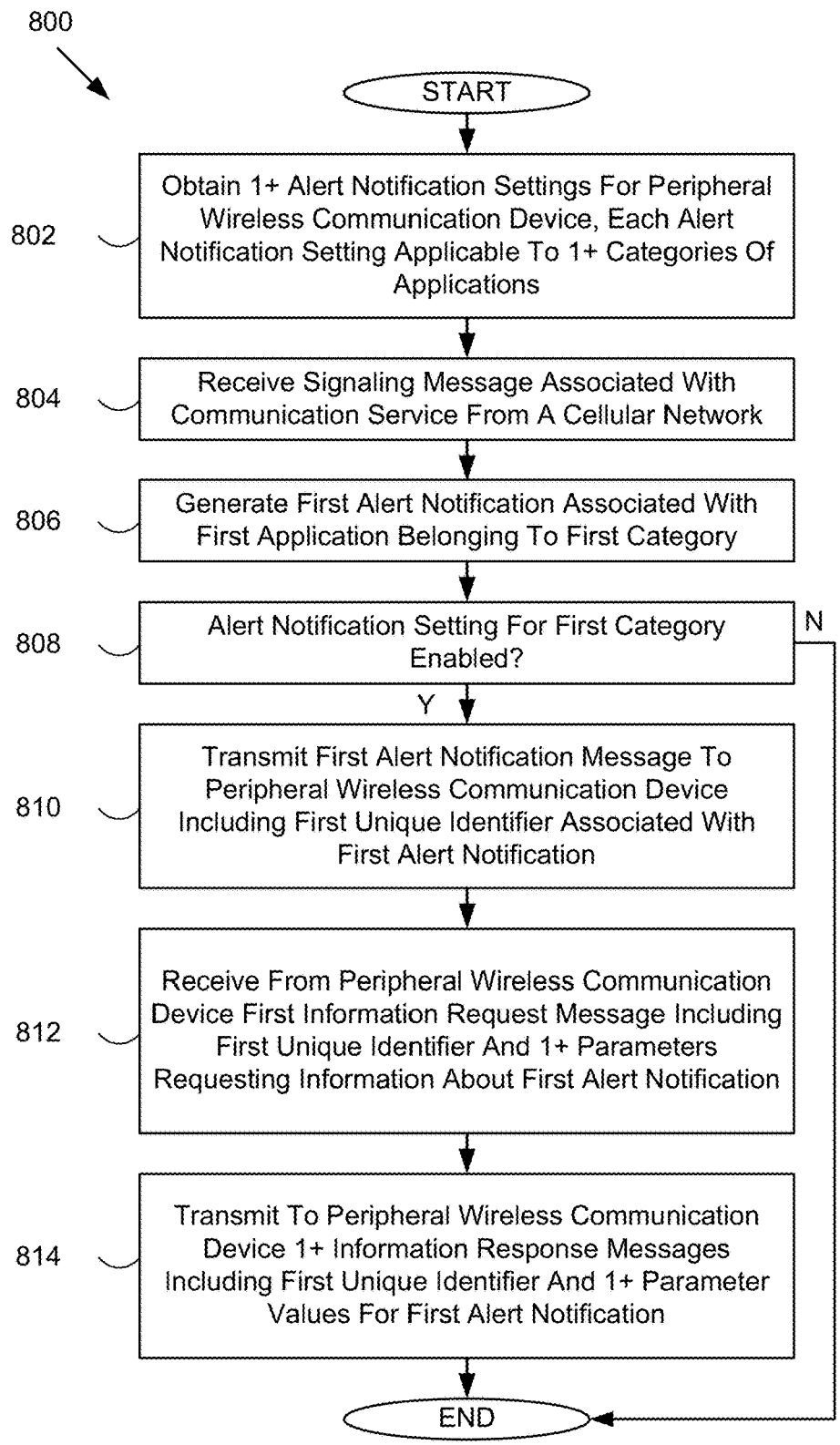
FIG. 8 illustrates a representative method for providing an interactive alert notification service over a connection between the central wireless communication device and the peripheral wireless communication device in accordance with some embodiments.

FIG. 8 illustrates a representative method 800 for providing an interactive alert notification service over a connection between the central wireless communication device 202 and the peripheral wireless communication device 204. The central wireless communication device 202, in communication with the peripheral wireless communication device 204, can execute the steps illustrated in FIG. 8 for the method 800. In a first step 802, the central wireless communication device 202 obtains one or more alert notification settings for the peripheral wireless communication device 204. Each alert notification setting can apply to one or more categories of applications, or to a particular application, or to a particular type of event. In some embodiments, one or more of the alert notification settings are obtained through the I/O interface 308 of the central wireless communication device 202. In some embodiments, one or more of the alert notification settings are obtained through the I/O interface 314 of the peripheral wireless communication device 204 and communicated over a connection to the central wireless communication device 202. In some embodiments, a connection between the central wireless communication device 202 and the peripheral wireless communication device 204 operates in accordance with a WPAN wireless communication protocol. In some embodiments, the WPAN wireless communication protocol is a version of a Bluetooth Low Energy (BTLE) wireless communication protocol.

In step 804, the central wireless communication device receives a signaling message associated with a communication service from a cellular network or a WWAN network. In some embodiments, the signaling message indicates an attempted or actual connection for a particular communication service provided through the cellular network or the WWAN network. In some embodiments, the signaling message is associated with establishing a connection for a voice service, a messaging service or a data service provided by the cellular network or the WWAN network. In some embodiments, the signaling message is associated with providing information for a particular communication service or set of communication services offered by and/or through the cellular network or the WWAN network. In step 806, the central wireless communication device 202 generates a first alert notification associated with a first application that belongs to a first category of applications. In some embodiments, processing circuitry in the central wireless communication device 202 generates the first alert notification in response to receiving the signaling message in step 804. In some embodiments, applications executing on an application processor in the central wireless communication device 202 generate the first alert notification in response to receiving and processing the signaling message. In some embodiments, wireless circuitry in the central wireless communication device 202 generates the first alert notification in response to receiving and processing the signaling message. In some embodiments, processing circuitry in the central wireless communication device 202 associates the signaling message for the communication service received from the cellular network or the WWAN network with the first application belonging to the first category of applications and generates a corresponding first alert notification.

In step 808, the central wireless communication device 202 determines whether an alert notification setting for the first category of applications is enabled. When the alert notification setting indicates that the first category of applications is not enabled for providing alert notification messages to the peripheral wireless communication device 204, the method 800 ends. In some embodiments, alert notification settings can be set to default values upon initial startup of the central wireless communication device 202. In some embodiments, a user of the central wireless communication device 202 can reset alert notification settings to default values. In some embodiments, each individual peripheral wireless communication device 204 associated with the central wireless communication device 202 can have a different set (or subset) of alert notification settings. In some embodiments, different types of peripheral wireless communication devices 204 can support different types of alert notification messages 600 (and thus some alert notification settings can be automatically enabled and/or disabled). In some embodiments, a user of the central wireless communication device 202 can enable alert notification messages 600 for one or more applications, set of applications, categories, sets of categories, or other groupings of applications that can provide alert notifications.

When the alert notification setting for the first category is enabled, in step 810, the central wireless communication device 202 can send a first alert notification message 600 to the peripheral wireless communication device 204. The first alert notification message 600 can include a first unique identifier (UID) 608 associated with the first alert notification received from the first application belonging to the first category of applications. In some embodiments, the first unique identifier 608 provides a unique value with which a series of alert notification messages 600, alert notification requests 610, and/or alert notification responses 620 can be mutually associated. In some embodiments, the first alert notification message 600 includes one or more of the following: a category identifier field 602 that includes a value for the first category of applications to which the first alert notification message 600 corresponds, a count field 604 that includes a numerical value for the alert notification associated with the first category, an event ID field 601 that includes a value for a status of the first alert notification within the first category, and an event flags field 603 that includes a bit mask indicating properties of the alert notification for use by the peripheral wireless communication device 204 upon receipt of the alert notification message 600 and/or display of the contents thereof. In an embodiment, the event ID field 601 includes a value that indicates the first alert notification is added to, modified within, or removed from the first category.

In step 812, the central wireless communication device 202 receives from the peripheral wireless communication device 204, a first information request message 610 that includes the first unique identifier 608 provided in the first alert notification message 600 and one or more parameters 612 for which the peripheral wireless communication device 204 requests information about the first alert notification. In an embodiment, the one or more parameters 612 in the first information request message 610 include a caller identifier, a sender identifier, a message title, a portion of content of a message, an application identifier, or a combination of these. In some embodiments, the set of parameters 612 included in the first information request message 610 depend upon the category of applications associated with the first alert notification message 600 as indicated by the category ID field 602 contained therein. In some embodiments, the first alert notification message 600 includes an application identifier (in place of or supplemental to the category identifier) for the first application. In an embodiment, the first information request message 610 includes one or more parameters 612 that request additional information about the first application indicated by the application identifier provided in the first alert notification message 600. In some embodiments, the set of parameters 612 include one or more maximum length values for associated attributes/parameters for which information is requested, thereby limiting an amount of information provided to the peripheral wireless communication device 204 in response to the first information request message 610.

In step 814, the central wireless communication device 202 responds to the first information request message 610 received from the peripheral wireless communication device 204 and sends to the peripheral wireless communication device 204 one or more information response messages 620. The one or more information response messages 620 include the first unique identifier 608 provided in the first alert notification message 600 and/or in the first information request message 610 and one or more parameters values 622 for the parameters 612 requested, the one or more parameter values 622 associated with the first alert notification. In some embodiments, the parameter values 622 are presented as a list of attributes including attribute identifiers, attribute lengths, and attribute values.

The alert notification service, in some embodiments, can include a set of command messages that can be sent from the peripheral wireless communication device 204 to the central wireless communication device 202, e.g., to cause an action at the central wireless communication device 202 in response to an alert notification message 600. In an embodiment, the central wireless communication device 202 receives one or more command messages, each command message including at least one command parameter that specifies an action for the central wireless communication device 202 to execute in response to the first alert notification message 600. The peripheral wireless communication device 204 can indicate the first alert notification message 600 (and/or an event associated with the first alert notification message 600) by including the unique identifier 608 from the first alert notification message 600 in the command message. The central wireless communication device 202 can execute the action specified by the command message received from the peripheral wireless communication device 204. The central wireless communication device 202 can also update a status of the first alert notification based at least in part on the action executed in response to the command message received from the peripheral wireless communication device 204.

The central wireless communication device 202 can send multiple alert notification messages 600 to the peripheral wireless communication device 204, and each alert notification message 600 can include a unique identifier field 608, with associated alert notification messages 600, alert request messages 610, and alert response messages 620 including the same value in the unique identifier field 608. In an embodiment, non-associated alert notification messages 600, alert request messages 610, and alert response messages 620 can include distinct (e.g., distinguishable by the peripheral wireless communication device 204) values that are not identical in the unique identifier field 608.

Figure 9:
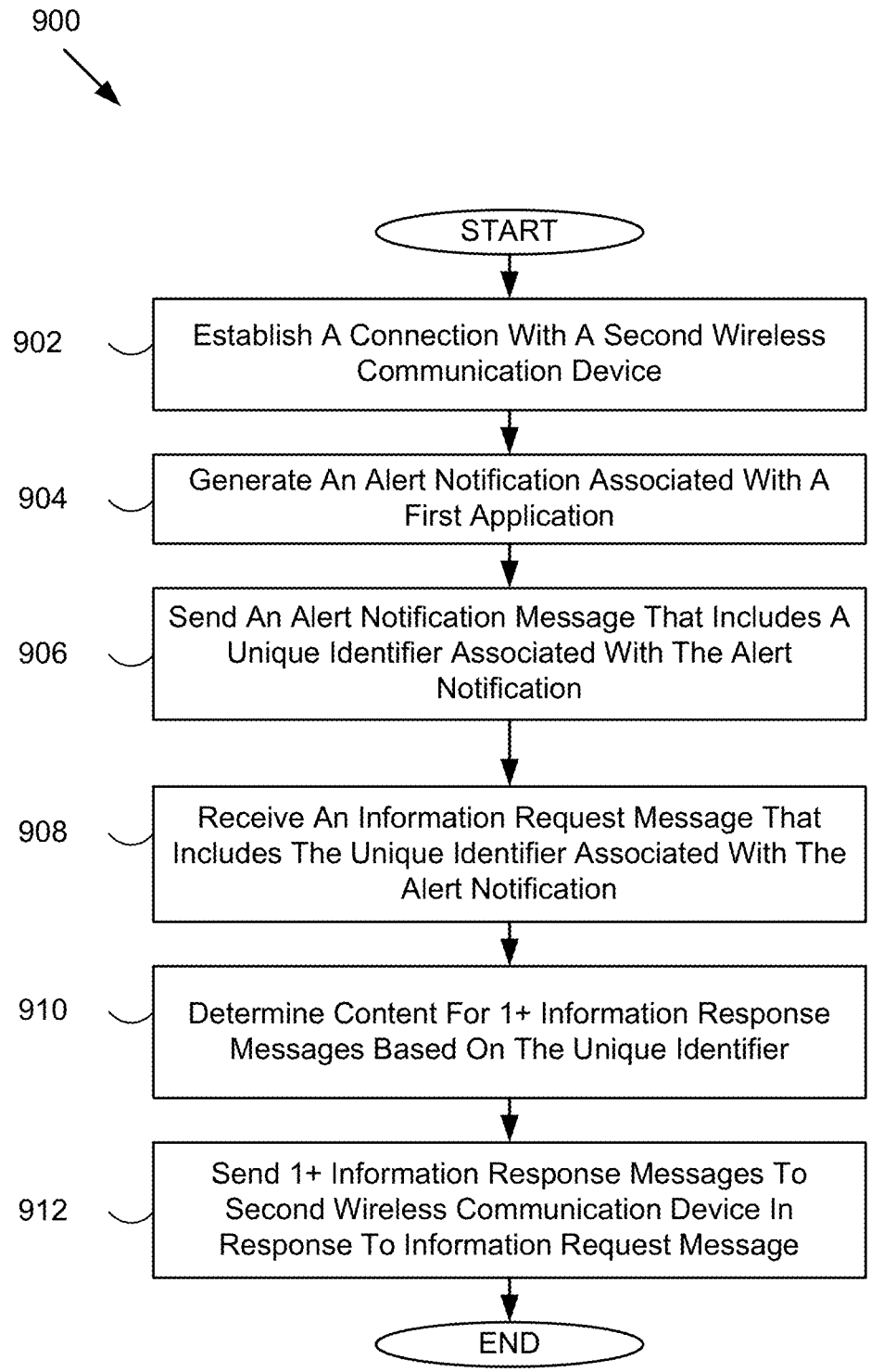
FIG. 9 illustrates another representative method for providing an interactive alert notification service over a connection between a central wireless communication device and a peripheral wireless communication device in accordance with some embodiments.

FIG. 9 illustrates another representative method 900 for providing an interactive alert notification service over a connection between a first wireless communication device, e.g., the central wireless communication device 202 and a second wireless communication device, e.g., a peripheral wireless communication device 204. In some embodiments, the central wireless communication device 202 performs one or more steps of the method 900. In step 902, the central wireless communication device 202 establishes a connection with the peripheral wireless communication device 204 in accordance with a wireless communication protocol. In some embodiments, the wireless communication protocol is a wireless personal area network (WPAN) communication protocol. In some embodiments, the wireless communication protocol is a BTLE communication protocol. In step 904, the central wireless communication device 202 generates an alert notification associated with a first application. In step 906, the central wireless communication device 202 sends an alert notification message 600 to the peripheral wireless communication device 204. In some embodiments, the alert notification message 600 includes a unique identifier field 608 containing a unique identifier (UID) value. In some embodiments, the UID value is associated with the alert notification associated with the first application. In step 908, the central wireless communication device 202 receives an information request message 610 from the peripheral wireless communication device 204. The information request message 610, in some embodiments, includes the UID value provided by the alert notification message 600. In some embodiments, the information request message 610 includes one or more parameters 612 for which the peripheral wireless communication device 204 requests information about the alert notification identified in the alert notification message 600. In step 910, the central wireless communication device 202 determines at least a portion of content for one or more information response messages 620 based on the UID value provided in information request message 610. In step 912, the central wireless communication device 202 sends one or more information response messages 620 to the peripheral wireless communication device 204 in response to the information request message 610.

Figure 10:
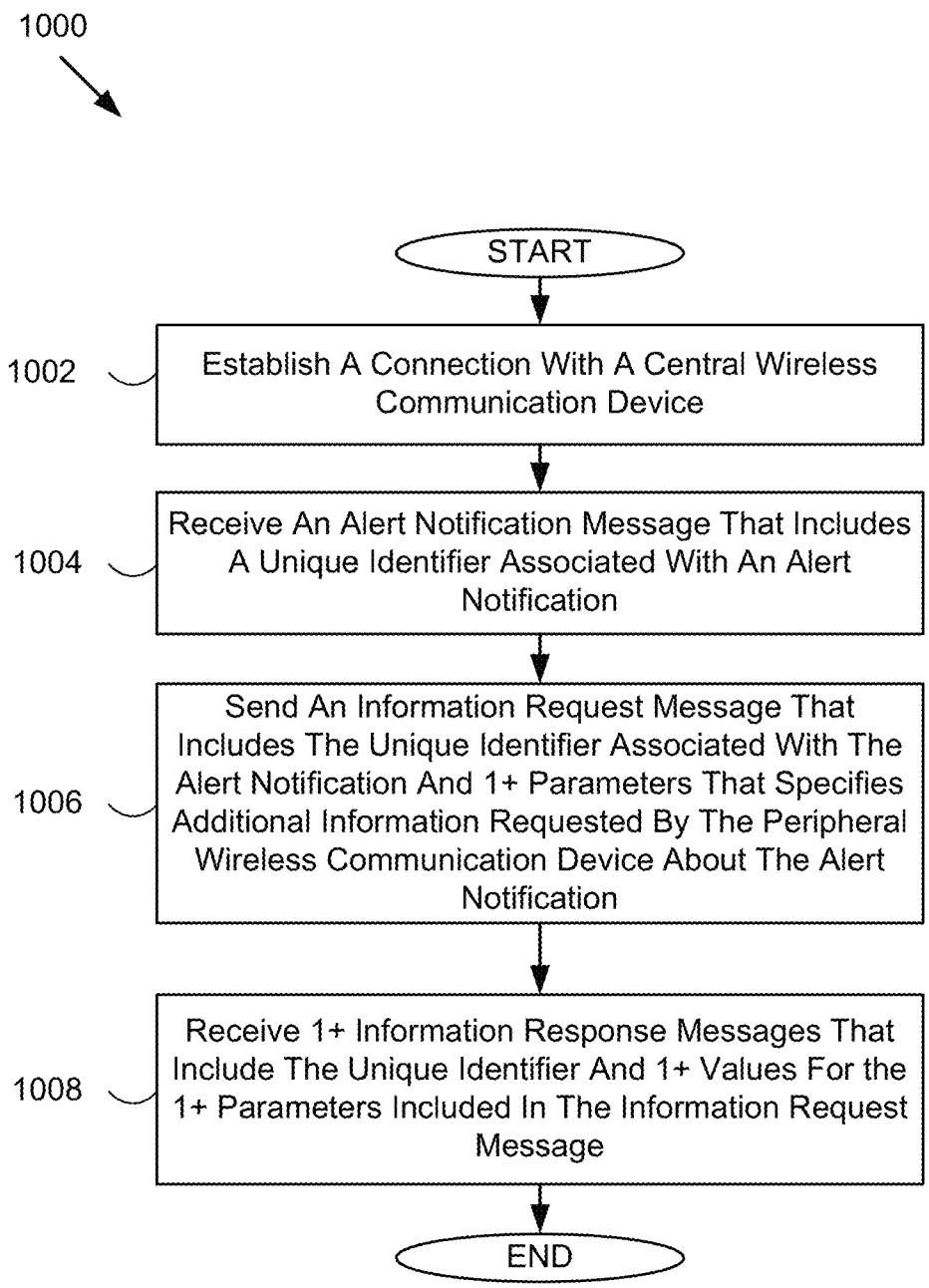
FIG. 10 illustrates a further representative method for providing an interactive alert notification service over a connection between a central wireless communication device and a peripheral wireless communication device in accordance with some embodiments.

FIG. 10 illustrates a further representative method 1000 for providing an interactive alert notification service over a connection between a central wireless communication device 202 and a peripheral wireless communication device 204 in accordance with some embodiments. In some embodiments, the peripheral wireless communication device 204 performs one or more steps of the method 1000. In step 1002, the peripheral wireless communication device 204 establishes a connection with the central wireless communication device 202. In step 1004, the peripheral wireless device 204 receives an alert notification message 600 from the central wireless communication device 202. In some embodiments, the alert notification message 600 includes a unique identifier 608 associated with an alert notification. In step 1006, the peripheral wireless communication device 204 sends an information request message 610 to the central wireless communication device 202. In some embodiments, the information request message 610 includes the unique identifier 608 received in the alert notification message 600 from the central wireless communication device 202 and also includes at least one parameter that specifies additional information requested by the peripheral wireless communication device 204 about the alert notification. In step 1008, the peripheral wireless communication device 204 receives a set of one or more information response messages 620 from the central wireless communication device 202. In some embodiments, the one or more information response messages 620 each include the unique identifier 608 and one or more values for the at least one parameter included in the information request message 610.

Figure 11:
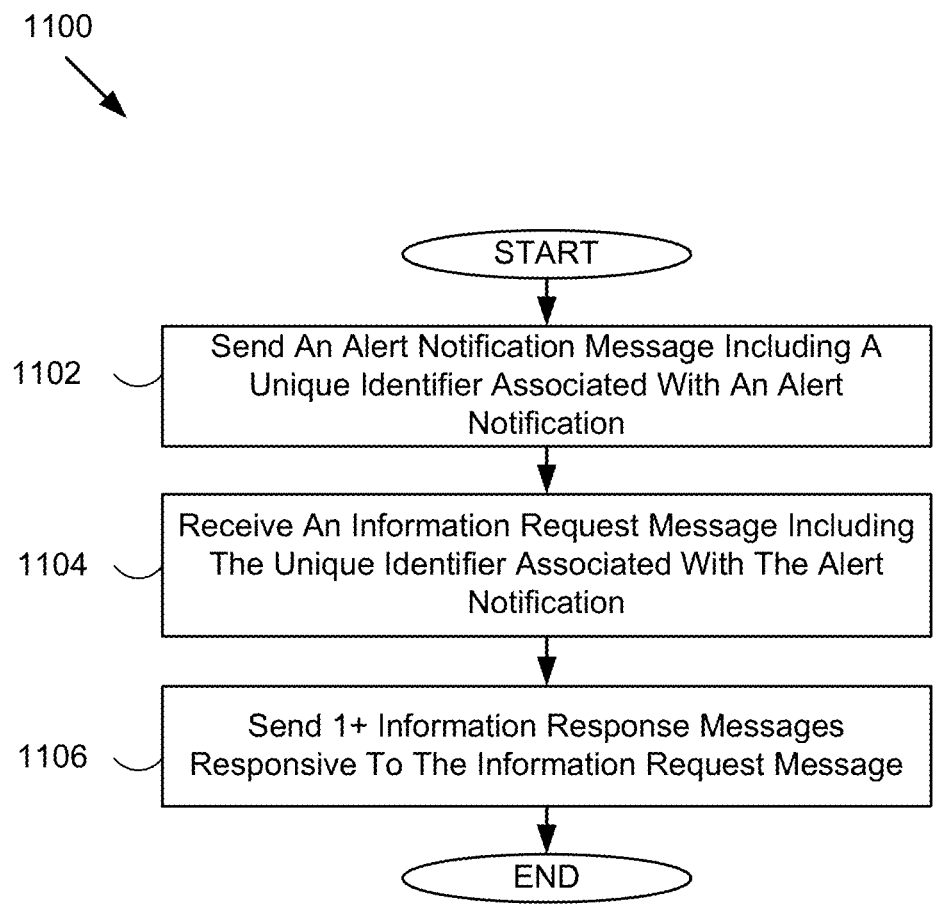
FIG. 11 illustrates another representative method for an alert notification service in accordance with some embodiments.

FIG. 11 illustrates a method 1100 for an alert notification service in accordance with some embodiments. In step 1102, a wireless communication device 102 sends an alert notification message 600 that includes a unique identifier associated with an alert notification to a second wireless communication device 102. In step 1104, the wireless communication device 102 receives an information request message 610 that includes the unique identifier associated with the alert notification from the second wireless communication device 102. In step 1106, the wireless communication device 102 sends one or more information response messages, which are responsive to the information request message, to the second wireless communication device 102.

Representative applications of systems, methods, apparatuses, and computer program products according to the present disclosure are described in this section hereinabove. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the detailed description provided, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Software, hardware, or a combination of hardware and software can implement various aspects of the described embodiments. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method for providing an alert notification service over a Bluetooth Low Energy (BTLE) connection between a central wireless communication device and a peripheral wireless communication device, the method comprising:
   by the central wireless communication device:
   obtaining one or more user configured alert notification settings for the peripheral wireless communication device, each alert notification setting applying specifically to one or more categories of applications that execute on the central wireless communication device and that generate alert notifications on the central wireless communication device;
   receiving a signaling message associated with a communication service from a cellular network;
   generating a first alert notification for a first application that belongs to a first category of applications in response to receipt of the signaling message;
   when an alert notification setting for the first category of applications indicates alert notifications are enabled for sending to the peripheral wireless communication device for the first category of applications:
   sending the first alert notification message over the BTLE connection to the peripheral wireless communication device, wherein the first alert notification message includes a unique identifier field that includes a first unique identifier value that is specific to and identifies the first alert notification and provides for associating together one or more subsequent messages sent to or received from the peripheral wireless communication device with the first alert notification;
   receiving over the BTLE connection from the peripheral wireless communication device a first information request message to request information related to the first alert notification, wherein the first information request message includes:
   a command identifier field that includes a value for indicating that the peripheral wireless communication device is requesting information about alert notifications,
   the first unique identifier value that is specific to and identifies the first alert notification for which information is requested, and
   a parameters field that includes at least one parameter value that specifies additional information requested about the first alert notification; and
   sending over the BTLE connection to the peripheral wireless communication device a set of one or more information response messages that include:
   one or more parameter values for the additional information requested about the first alert notification, and
   the first unique identifier value that is specific to the first alert notification to link the one or more parameter values to the first alert notification.

2. The method of claim 1, wherein:
   the signaling message indicates an attempted or actual connection for the communication service, and
   the communication service includes a voice service, a messaging service, or a data service provided by the cellular network.

3. The method of claim 1, wherein obtaining one or more alert notification settings for the peripheral wireless communication device comprises:
   receiving the one or more alert notification settings over the BTLE connection from the peripheral wireless communication device in one or more alert setting messages.

4. The method of claim 1, wherein obtaining one or more alert notification settings for the peripheral wireless communication device comprises:
   receiving the one or more alert notification settings through an input/output interface of the central wireless communication device,
   wherein the input-output interface is separate from one or more wireless communication interfaces of the central wireless communication device.

5. The method of claim 1, wherein the first alert notification message further comprises:
   a category field that includes a value for the first category of applications, a count field that includes a numerical value for a number of alert notifications specific to the first category of applications, and an event identifier field that includes a value for a status of the first alert notification within the first category of applications.

6. The method of claim 5, wherein the value in the event identifier field indicates the status of the first alert notification is one of: added to, modified within, or removed from the first category of applications.

7. The method of claim 1, wherein the at least one parameter includes one or more of: a caller identifier, a sender identifier, a message title, a portion of content of a message, or an application identifier.

8. The method of claim 1, further comprising:
by the central wireless communication device:
receiving over the BTLE connection from the peripheral wireless communication device a second information request message, wherein the second information request message includes:
the first unique identifier value that is specific to the first alert notification, and
a parameter value that indicates a request for identification of the first application that generated the first alert notification.

9. The method of claim 1, further comprising:
by the central wireless communication device:
receiving over the BTLE connection from the peripheral wireless communication device a command message, wherein the command message includes:
the first unique identifier value that is specific to the first alert notification, and
at least one command parameter that specifies an action for the central wireless communication device to execute in response to the first alert notification;
executing the action specified by the command message; and
updating a status of the first alert notification based at least in part on the action.

10. The method of claim 1, further comprising:
by the central wireless communication device:
generating a second alert notification for the first application that belongs to the first category in response to an event that is subsequent to and separate from receipt of the signaling message associated with the communication service from the cellular network; and
sending a second alert notification message over the BTLE connection to the peripheral wireless communication device, the second alert notification message including a second unique identifier value that is specific to the second alert notification and provides for associating together subsequent messages sent to or received from the peripheral wireless communication device with the second alert notification;
wherein the first unique identifier value differs from the second unique identifier value.

11. A wireless communication device comprising:
wireless circuitry configured to send data to and receive data from a second wireless communication device in accordance with a wireless communication protocol; and
processing circuitry communicatively coupled to the wireless circuitry, the processing circuitry configured to control the wireless communication device to:
establish a connection with the second wireless communication device in accordance with the wireless communication protocol;
generate an alert notification for a first application that is executing on the wireless communication device;
send an alert notification message to the second wireless communication device, wherein the alert notification message includes a unique identifier field that includes a unique identifier value that is specific to and identifies the alert notification and provides for associating together one or more subsequent messages sent to or received from the peripheral wireless communication device with the alert notification;
receive an information request message from the second wireless communication device that requests information related to the alert notification, wherein the information request message includes:
the unique identifier value that is specific to and identifies the alert notification for which information is requested, and
a parameters field that includes at least one parameter value that specifies additional information requested about the alert notification;
determine at least a portion of content for one or more information response messages based on the unique identifier value; and
send the one or more information response messages to the second wireless communication device in response to receipt of the information request message, the one or more information response messages includes:
one of more parameter values for the additional information requested about the alert notification, and
the unique identifier value that is specific to the alert notification to link the one or more parameter values to the alert notification.

12. The wireless communication device of claim 11, wherein the processing circuitry is further configured to control the wireless communication device to:
obtain an alert notification setting from the second wireless communication device through the connection, the alert notification setting providing an indication to enable sending alert notifications to the second wireless communication device for a first application, wherein the first application belongs to a first category of applications.

13. The wireless communication device of claim 11, wherein the wireless communication protocol is a Bluetooth Low Energy wireless personal area network (WPAN) communication protocol.

14. The wireless communication device of claim 11, wherein:
the alert notification message includes a category field that specifies the first category of applications or an application field that specifies the first application for the alert notification, and
the information request message includes a request for additional information about the first application for the alert notification.

15. The wireless communication device of claim 14, wherein the additional information requested about the first application includes an application name, an application category, or both.

16. The wireless communication device of claim 11, wherein the information request message includes a list of parameters in the parameters field, and the at least a portion of content for the one or more information response messages includes values for each parameter in the list of parameters.

17. The wireless communication device of claim 16, wherein the list of parameters includes one or more of: a caller identifier, a sender identifier, a message title, a portion of content of a message, or an application identifier.

18. The wireless communication device of claim 11, wherein the alert notification message further includes:
- a category field that includes a value for the first category of applications,
- a count field that includes a numerical value for a number of alert notifications specific to the first category of applications, and
- an event identifier field that includes a value for a status of the alert notification within the first category of applications.

19. The wireless communication device of claim 18, wherein the value in the event identifier field indicates the status of the alert notification is one of: added to, modified within, or removed from the first category of applications.

20. A method, comprising:
- by a wireless communication device:
  - sending an alert notification message to a second wireless communication device, wherein the alert notification message includes a unique identifier value that is specific to and identifies an alert notification and provides for associating together subsequent messages sent to or received from the second wireless communication device with the alert notification, and wherein the alert notification is for an application executing on the wireless communication device;
  - receiving an information request message from the second wireless communication device that requests information about the alert notification, wherein the information request message includes the unique identifier value that is specific to and identifies the alert notification for which information is requested; and
  - sending to the second wireless communication device, in response to the information request message, one or more information response messages that include:
    - one or more parameter values for information requested about the alert notification, and
    - the unique identifier value that is specific to the alert notification to link the one or more parameter values to the alert notification.

* * * * *